(12) United States Patent
Uchiyama et al.

(10) Patent No.: US 10,673,037 B2
(45) Date of Patent: Jun. 2, 2020

(54) BATTERY PACK

(71) Applicant: DENSO CORPORATION, Kariya, Aichi-pref. (JP)

(72) Inventors: Daiki Uchiyama, Kariya (JP); Takahiro Soki, Kariya (JP); Kojiro Kita, Kariya (JP)

(73) Assignee: DENSO CORPORATION, Kariya (JP)

( * ) Notice: Subject to any disclaimer, the term of this patent is extended or adjusted under 35 U.S.C. 154(b) by 246 days.

(21) Appl. No.: 15/819,610

(22) Filed: Nov. 21, 2017

(65) Prior Publication Data
US 2018/0145291 A1 May 24, 2018

(30) Foreign Application Priority Data

Nov. 24, 2016 (JP) .................................. 2016-228303
Sep. 27, 2017 (JP) .................................. 2017-186162

(51) Int. Cl.
*H01M 2/10* (2006.01)
*H01M 10/04* (2006.01)

(52) U.S. Cl.
CPC ....... *H01M 2/1077* (2013.01); *H01M 2/1083* (2013.01); *H01M 10/0481* (2013.01); *H01M 2220/20* (2013.01)

(58) Field of Classification Search
CPC ............. H01M 2/1077; H01M 2/1083; H01M 2220/20; H01M 10/0481
See application file for complete search history.

(56) References Cited

U.S. PATENT DOCUMENTS

| 2013/0157103 | A1 | 6/2013 | Osakabe et al. |
| 2013/0164569 | A1* | 6/2013 | Srinivasan .......... H01M 2/1077 429/7 |
| 2017/0352850 | A1* | 12/2017 | Nagane ............... H01M 2/1077 |
| 2018/0090729 | A1* | 3/2018 | Cao ..................... H01M 2/1016 |

FOREIGN PATENT DOCUMENTS

JP 2013-145649 A 7/2013

\* cited by examiner

*Primary Examiner* — Brittany L Raymond
(74) *Attorney, Agent, or Firm* — Oliff PLC

(57) ABSTRACT

A battery pack includes at least one battery module and a pair of pack end plates arranged to hold the at least one battery module therebetween in a predetermined direction. Each battery module includes a plurality of battery cells arranged in alignment with each other in the predetermined direction and a pair of module end plates arranged to hold the battery cells therebetween in the predetermined direction. Moreover, the strength of the pack end plates in the predetermined direction is set to be higher than or equal to a minimum required strength to hold the at least one battery module therebetween in a predetermined state where the battery cells of the at least one battery module have deteriorated. The strength of the module end plates of the at least one battery module in the predetermined direction is set to be lower than the strength of the pack end plates.

11 Claims, 22 Drawing Sheets

BATTERY PACK

CROSS-REFERENCE TO RELATED APPLICATIONS

This application is based on and claims priority from Japanese Patent Applications No. 2016-228303 filed on Nov. 24, 2016 and No. 2017-186162 filed on Sep. 27, 2017, the contents of which are hereby incorporated by reference in their entireties into this application.

BACKGROUND

1. Technical Field

The present invention relates to battery packs which have a plurality of battery modules held between a pair of pack end plates and each having a plurality of battery cells held between a pair of module end plates.

2. Description of Related Art

Japanese Patent Application Publication No. JP2013145649A discloses an assembled battery (or battery pack) which has a plurality of battery modules received in an assembled-battery case and each having a plurality of batteries received in a module case.

Specifically, in the assembled battery, the battery modules are arranged in alignment with each other in a vertical direction and together received in the assembled-battery case; the assembled-battery case is composed of a pair of upper and lower assembled-battery cases. Moreover, in each of the battery modules, the batteries are arranged in alignment with each other in the vertical direction and together received in the module case; the module case is composed of a pair of upper and lower module cases.

Furthermore, in the assembled battery, the upper assembled-battery case is fixed to the lower assembled-battery case with a load applied to all the batteries of the battery modules. Consequently, the battery modules are held in a state of being sandwiched between the pair of upper and lower assembled-battery cases. Moreover, in each of the battery modules, the batteries are held in a state of being sandwiched between the pair of upper and lower module cases.

However, the inventors of the present invention have found that the assembled battery disclosed in the above patent document involves the following problems.

That is, in the assembled battery, the battery modules are sandwiched between the pair of upper and lower assembled-battery cases. Moreover, in each of the battery modules, the batteries are sandwiched between the pair of upper and lower module cases. However, as the batteries of the battery modules deteriorate, they swell and thus increase in size. Therefore, it is required to reliably hold the battery modules between the pair of upper and lower assembled-battery cases and the batteries between the pair of upper and lower module cases in each of the battery modules even when the batteries of the battery modules swell with deterioration. To meet this requirement, one may consider designing all of the pair of upper and lower assembled-battery cases and the pair of upper and lower module cases in each of the battery modules to have the same high strength. However, in this case, the size of the assembled battery would be increased. In other words, it would become impossible to minimize the size of the assembled battery.

SUMMARY

According to exemplary embodiments, there is provided a battery pack which includes at least one battery module and a pair of pack end plates. The at least one battery module includes a single battery module or a plurality of battery modules arranged in alignment with each other in a predetermined direction. Each battery module includes a plurality of battery cells and a pair of module end plates. The battery cells are arranged in alignment with each other in the predetermined direction. The module end plates are arranged to hold the battery cells therebetween in the predetermined direction and thereby keep a dimension of the battery module in the predetermined direction constant. Each of the module end plates abuts a corresponding one of the battery cells which is located outermost in the battery cells in the predetermined direction. The pack end plates are arranged to hold the at least one battery module therebetween in the predetermined direction and thereby keep a dimension of the battery pack in the predetermined direction constant. Each of the pack end plates abuts a corresponding one of the module end plates of the at least one battery module which is located outermost in the at least one battery module in the predetermined direction. Moreover, the strength of the pack end plates in the predetermined direction is set to be higher than or equal to a minimum required strength to hold the at least one battery module therebetween in a predetermined state where the battery cells of the at least one battery module have deteriorated. The strength of the module end plates of the at least one battery module in the predetermined direction is set to be lower than the strength of the pack end plates in the predetermined direction.

With the above configuration, in the predetermined state where the battery cells of the at least one battery module swell due to the deterioration thereof, it is still possible to hold all the battery cells of the at least one battery module in the battery pack by the pack end plates. Consequently, it becomes possible to set the strength of the module end plates of the at least one battery module in the predetermined direction to be lower than the strength of the pack end plates in the predetermined direction. As a result, it becomes possible to reduce the size of the module end plates of the at least one battery module. Accordingly, it becomes possible to minimize the size of the battery pack while ensuring high capability thereof to cope with the swelling of the battery cells with deterioration.

BRIEF DESCRIPTION OF THE DRAWINGS

The present invention will be understood more fully from the detailed description given hereinafter and from the accompanying drawings of exemplary embodiments, which, however, should not be taken to limit the present invention to the specific embodiments but are for the purpose of explanation and understanding only.

In the accompanying drawings.

DESCRIPTION OF EMBODIMENTS

Figure 1:
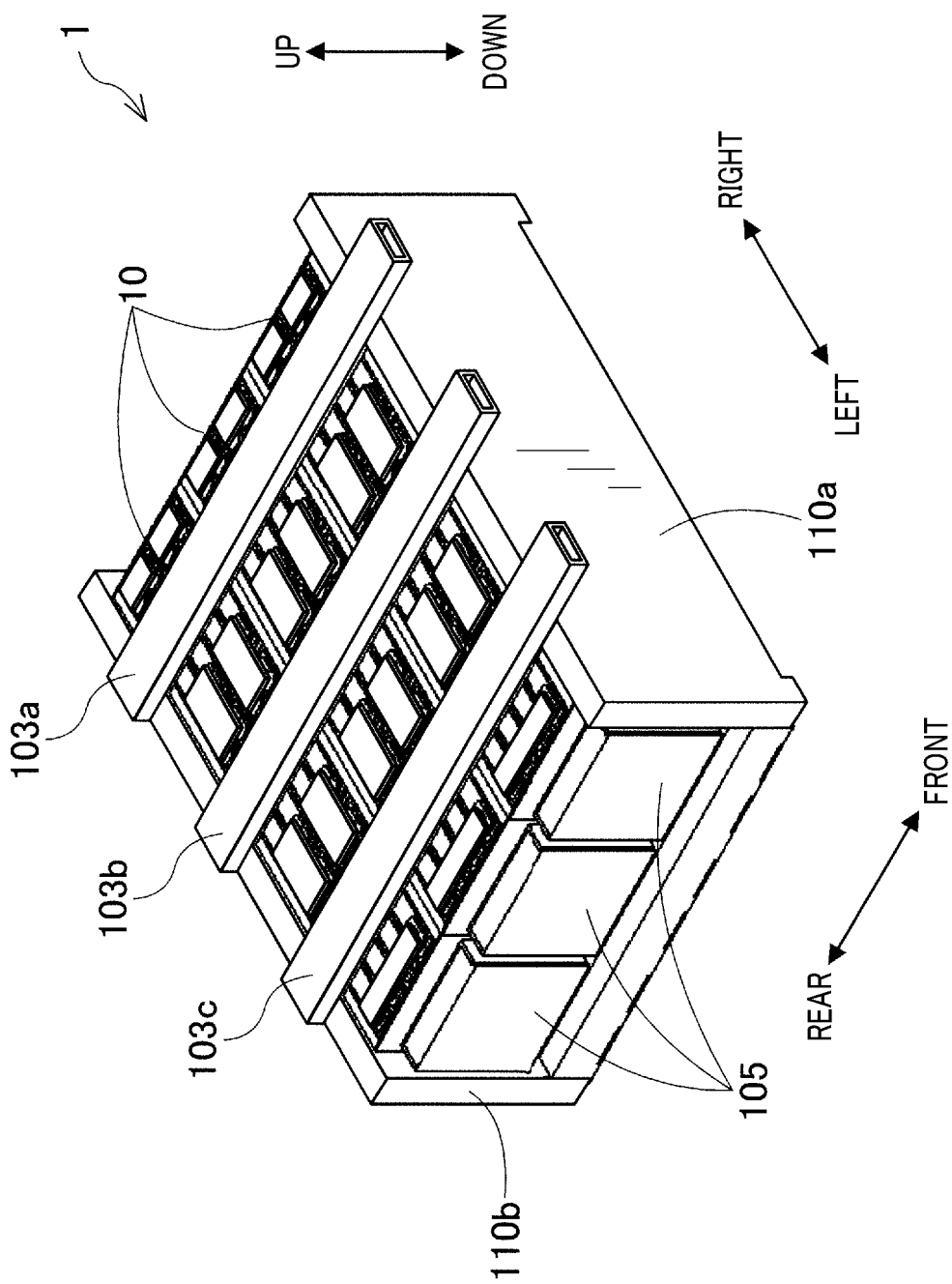
FIG. 1 is a perspective view of a battery pack according to a first embodiment.
Figure 2:
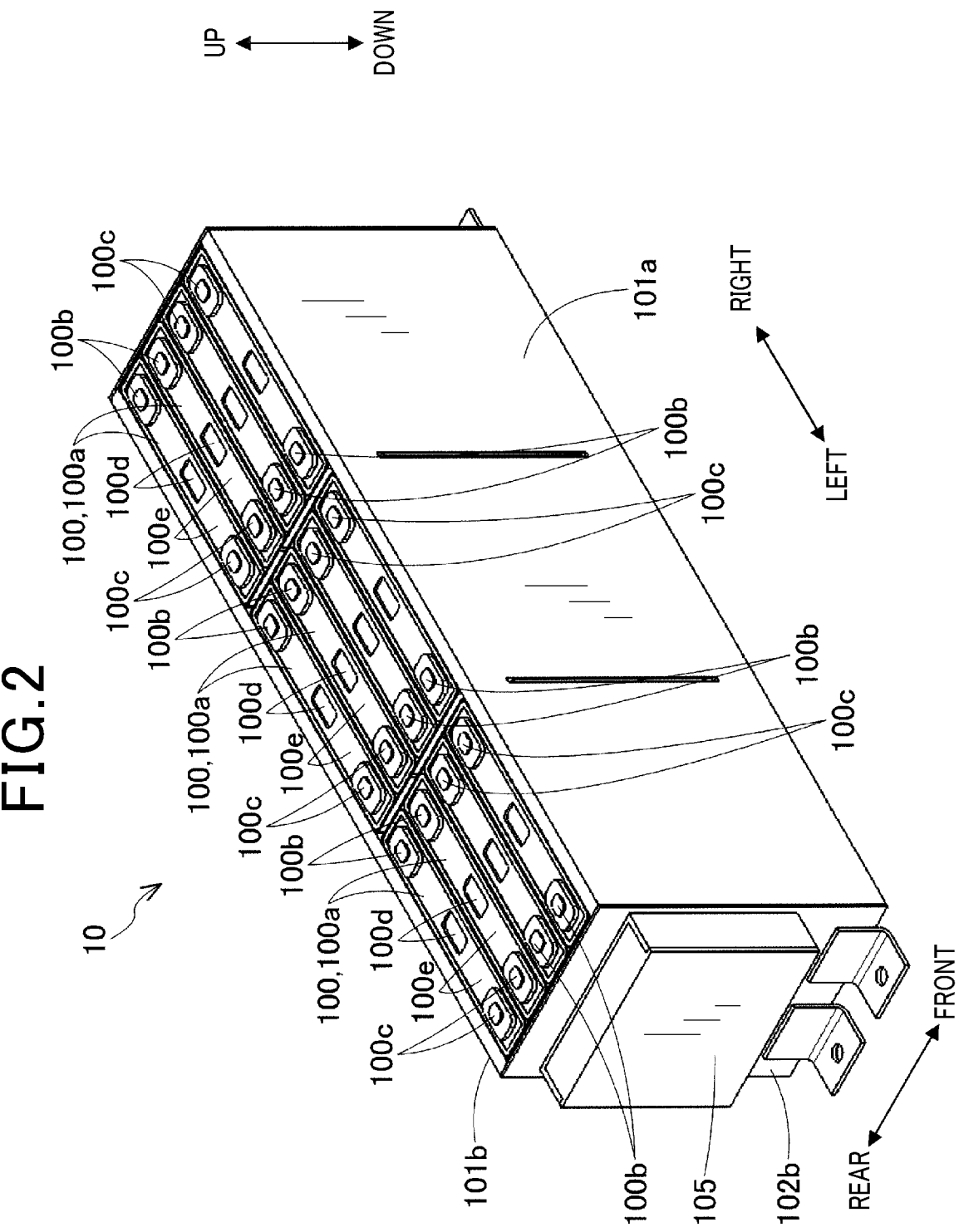
FIG. 2 is a perspective view of one of battery modules of the battery pack according to the first embodiment, omitting restraining members, busbars and wiring members therefrom.

Exemplary embodiments and their modifications will be described hereinafter with reference to FIGS. 1-22. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

FIG. 1 shows the overall configuration of a battery pack 1 according to a first embodiment.

In the present embodiment, the battery pack 1 is designed to be used in a motor vehicle to supply DC power to, for example, electronic devices provided in the vehicle.

As shown in FIG. 1, the battery pack 1 is a battery module assembly which is obtained by connecting a plurality of battery modules 10. More particularly, in the present embodiment, the battery pack 1 includes three battery modules 10, a pair of pack end plates 110a and 110b and a plurality of restraining members 103a-103c.

As shown in FIGS. 2-6, each of the battery modules 10 is a battery cell assembly which is obtained by connecting a plurality of battery cells 100. More particularly, in the present embodiment, each of the battery modules 10 includes six battery cell pairs that are electrically connected in series with each other; each battery cell pair consists of two battery cells 100 that are electrically connected in parallel with each other. That is, each of the battery modules 10 includes a total of twelve battery cells 100. Moreover, each of the battery modules 10 also includes a pair of module end plates 101a and 101b, a pair of module side plates 102a and 102b, a plurality (e.g., seven) of busbars 104a-104g and a voltage monitoring unit 105.

Each of the battery cells 100 is a secondary battery which can be charged, discharged into a load, and recharged many times. Each of the battery cells 100 includes a main body 100a, a positive terminal 100b, a negative terminal 100c and a gas exhaust portion 100d.

The main body 100a is cuboid in shape. The main body 100a has a rectangular terminal surface 100e and a rectangular bottom surface 100f facing away from the terminal surface 100e.

The positive terminal 100b and the negative terminal 100c are provided on the terminal surface 100e of the main body 100a so as to be spaced from each other at a predetermined interval.

The gas exhaust portion 100d is a thin portion of the main body 100 which is thinner than the other portions around it. The gas exhaust portion 100d is provided to exhaust, in a fault condition, gas produced in the main body 100a to the outside of the main body 100a. The gas exhaust portion 100d is located between the positive terminal 100b and the negative terminal 100c on the terminal surface 100e of the main body 100a.

In each of the battery modules 10, the twelve battery cells 100 are arranged so that: every four battery cells 100 are aligned with each other in the front-rear direction; and every three battery cells 100 are aligned with each other in the left-right direction. Moreover, for each of the battery cells 100, the terminal surface 100e of the battery cell 100 faces upward; the shorter sides of the terminal surface 100e extend in the front-rear direction; and the longer sides of the terminal surface 100e extend in the left-right direction. Furthermore, all the terminal surfaces 100e of the battery cells 100 are flush with each other (or located at the same position in the vertical direction); and all the bottom surfaces 100f of the battery cells 100 are flush with each other. For each of the six battery cells 100 in the front two rows, the positive terminal 100b of the battery cell 100 is located on the left side while the negative terminal 100c of the battery cell 100 is located on the right side. In contrast, for each of the six battery cells 100 in the rear two rows, the positive terminal 100b of the battery cell 100 is located on the right side while the negative terminal 100c of the battery cell 100 is located on the left side.

It should be noted that the expressions of front side (or forward), rear side (or backward), left side (or leftward), right side (or rightward), upper side (or upward) and lower side (or downward) are used in the description and the drawings only for the sake of convenience of explanation and ease of understanding.

In each of the battery modules 10, the pair of module end plates 101a and 101b are arranged respectively on the front and rear sides of the battery cells 100 to sandwich (or clamp) the battery cells 100 therebetween, thereby keeping the dimension of the battery module 10 in the front-rear direction constant. Specifically, each of the module end plates 101a and 101b is formed of metal into the shape of a plate. Moreover, the module end plate 101a is arranged to abut the main bodies 100a of those three battery cells 100 which are located most forward in all the twelve battery cells 100 while the module end plate 101b is arranged to abut the main bodies 100a of those three battery cells 100 which are located most backward.

The pair of module side plates 102a and 102b are arranged respectively on the right and left sides of the battery cells 100 and the pair of module end plates 101a and 101b to sandwich the battery cells 100 and the pair of module end plates 101a and 101b therebetween. Specifically, each of the module side plates 102a and 102b is formed of metal or resin into the shape of a thin plate. Moreover, the module side plate 102a is shaped to cover all of the battery cells 100 and the pair of module end plates 101a and 101b from the right side; the module side plate 102b is shaped to cover all of the battery cells 100 and the pair of module end plates 101a and 101b from the left side. In addition the module side plate 102a is fixed to both the right ends of the pair of module end plates 101a and 101b; the module side plate 102b is fixed to both the left ends of the pair of module end plates 101a and 101b.

The restraining members 103a-103c are provided to restrain the pair of module end plates 101a and 101b of each of the battery modules 10. Specifically, each of the restraining members 103a-103c is formed of metal or resin into the shape of a rectangular pipe. The restraining members 103a-103c have formed therein gas passages through which the gas exhausted from the gas exhaust portions 100d of the battery cells 100 flows. The restraining members 103a-103c are each fixed to the pair of pack end plates 110a and 110b, thereby restraining the pair of module end plates 101a and 101b of each of the battery modules 10 via the pair of pack end plates 110a and 110b.

Figure 4:
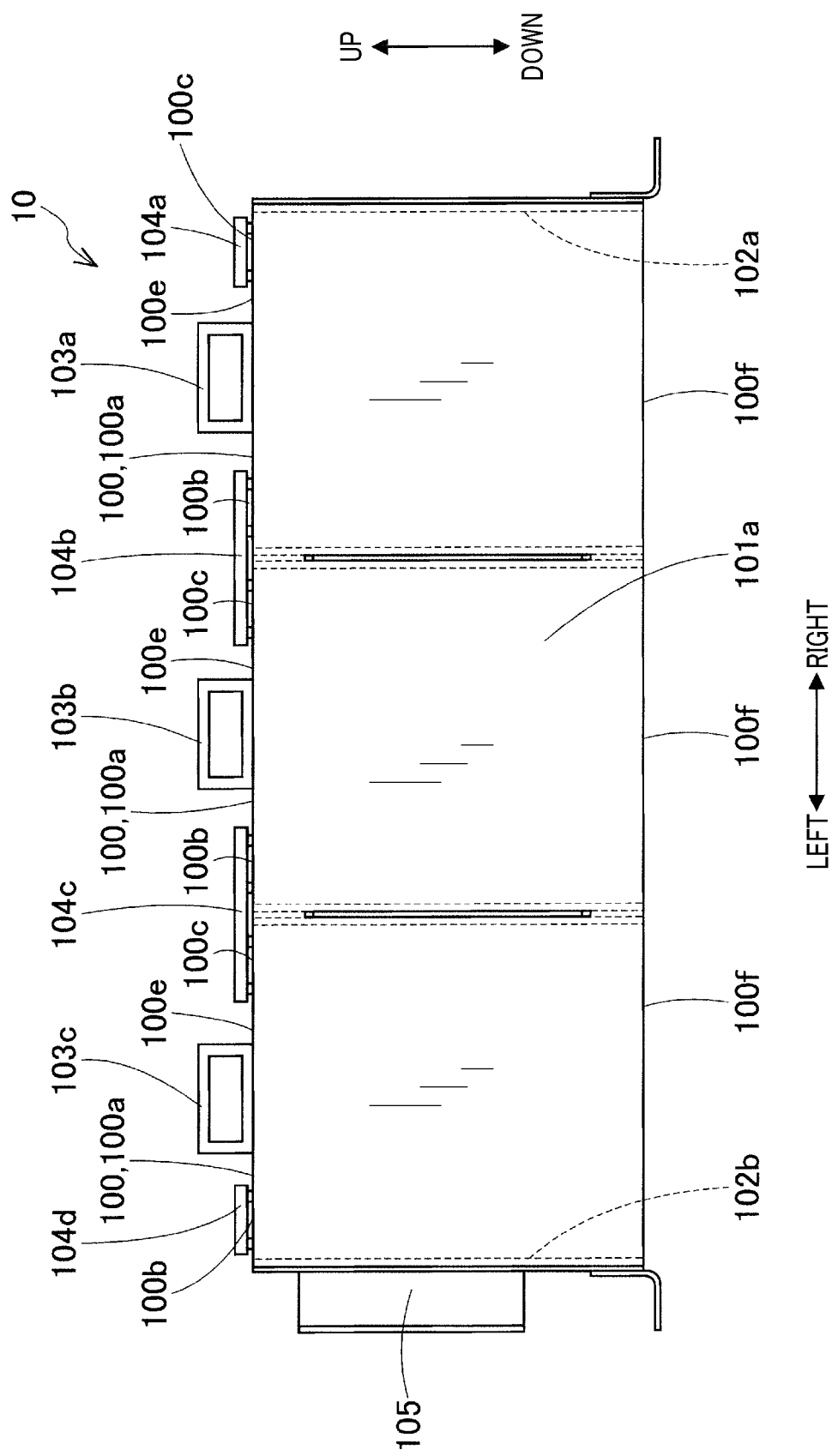
FIG. 4 is a front view of the battery module.
Figure 5:
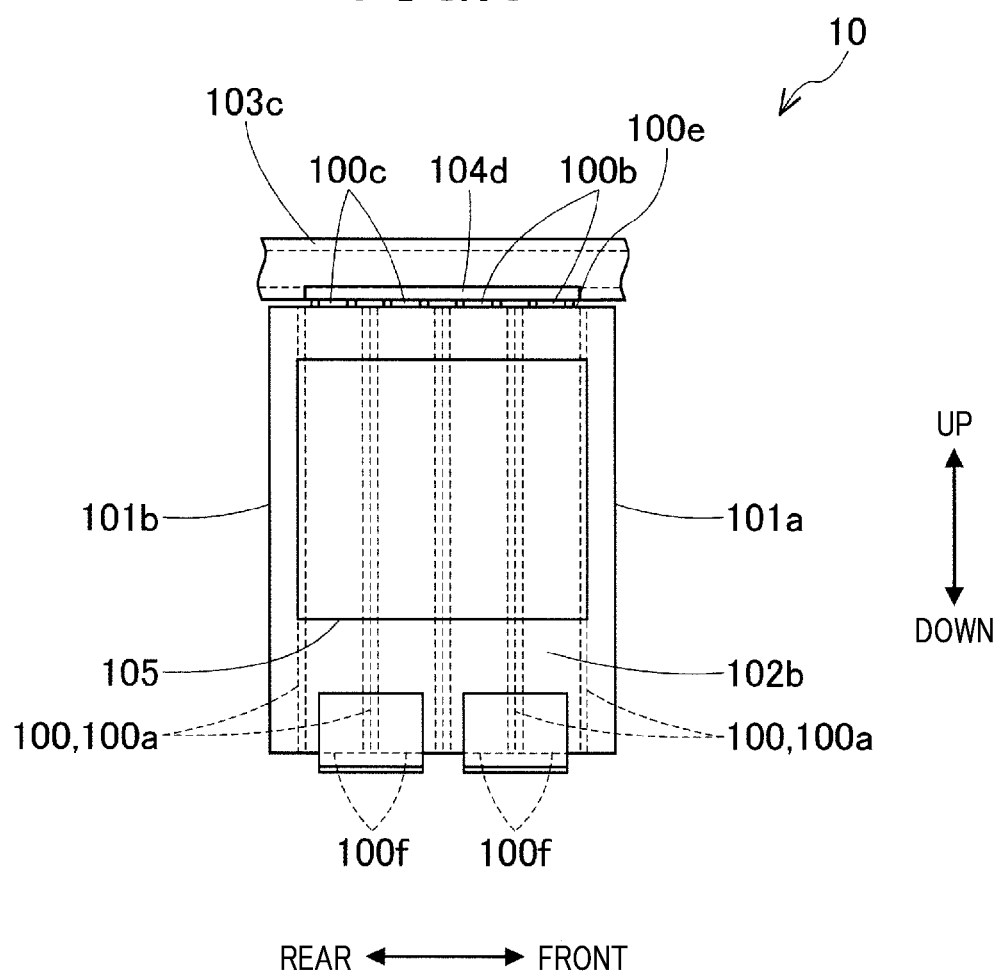
FIG. 5 is a side view of the battery module.

In the present embodiment, as shown in FIGS. 1 and 4, there are provided three restraining members 103a, 103b and 103c on the upper side of the battery modules 10 and the pair of pack end plates 110a and 110b. The restraining member 103a is arranged so as to: face the terminal surfaces 100e of the main bodies 100a of those battery cells 100 which are located most rightward among all the battery cells 100 of the battery modules 10; extend in the front-rear direction; and intersect the pair of module end plates 101a and 101b of each of the battery modules 10. The restraining member 103b is arranged so as to: face the terminal surfaces 100e of the main bodies 100a of those battery cells 100 which are centered in the left-right direction; extend in the front-rear direction; and intersect the pair of module end plates 101a and 101b of each of the battery modules 10. The restraining member 103c is arranged so as to: face the terminal surfaces 100e of the main bodies 100a of those battery cells 100 which are located most leftward among all the battery cells 100 of the battery modules 10; extend in the front-rear direction; and intersect the pair of module end plates 101a and 101b of each of the battery modules 10. Moreover, as shown in FIG. 6, each of the restraining members 103a-103c has a plurality of openings 103d formed therein; each of the openings 103d is opposed to a corresponding one of the gas exhaust portions 100d of the battery cells 100 of the battery modules 10 so that the gas exhausted from the corresponding gas exhaust portion 100d can be introduced into the restraining member via the opening 103d.

In addition, though not shown in the figures, there are also provided a plurality (e.g., three) of restraining members on the lower side of the battery modules 10 and the pair of pack end plates 110a and 110b. These restraining members are each formed of metal or resin into the shape of a plate. Moreover, these restraining members are each fixed to the pair of pack end plates 110a and 110b, thereby restraining the pair of module end plates 101a and 101b of each of the battery modules 10 via the pair of pack end plates 110a and 110b. However, unlike the above-described the restraining members 103a-103c, these restraining members have no gas passages formed therein.

In each of the battery modules 10, the busbars 104a-104g are provided to electrically connect the battery cells 100 of the battery module 10. Specifically, each of the busbars 104a-104g is formed of metal into the shape of a plate. Moreover, each of the busbars 104a and 104g is provided to electrically connect a pair of the battery cells 100 in parallel with each other. On the other hand, each of the busbars 104c-104f is provided to electrically connect a pair of the battery cells 100 in parallel with each other while electrically connecting two pairs of the parallel-connected battery cells 100 in series with each other.

Figure 3:
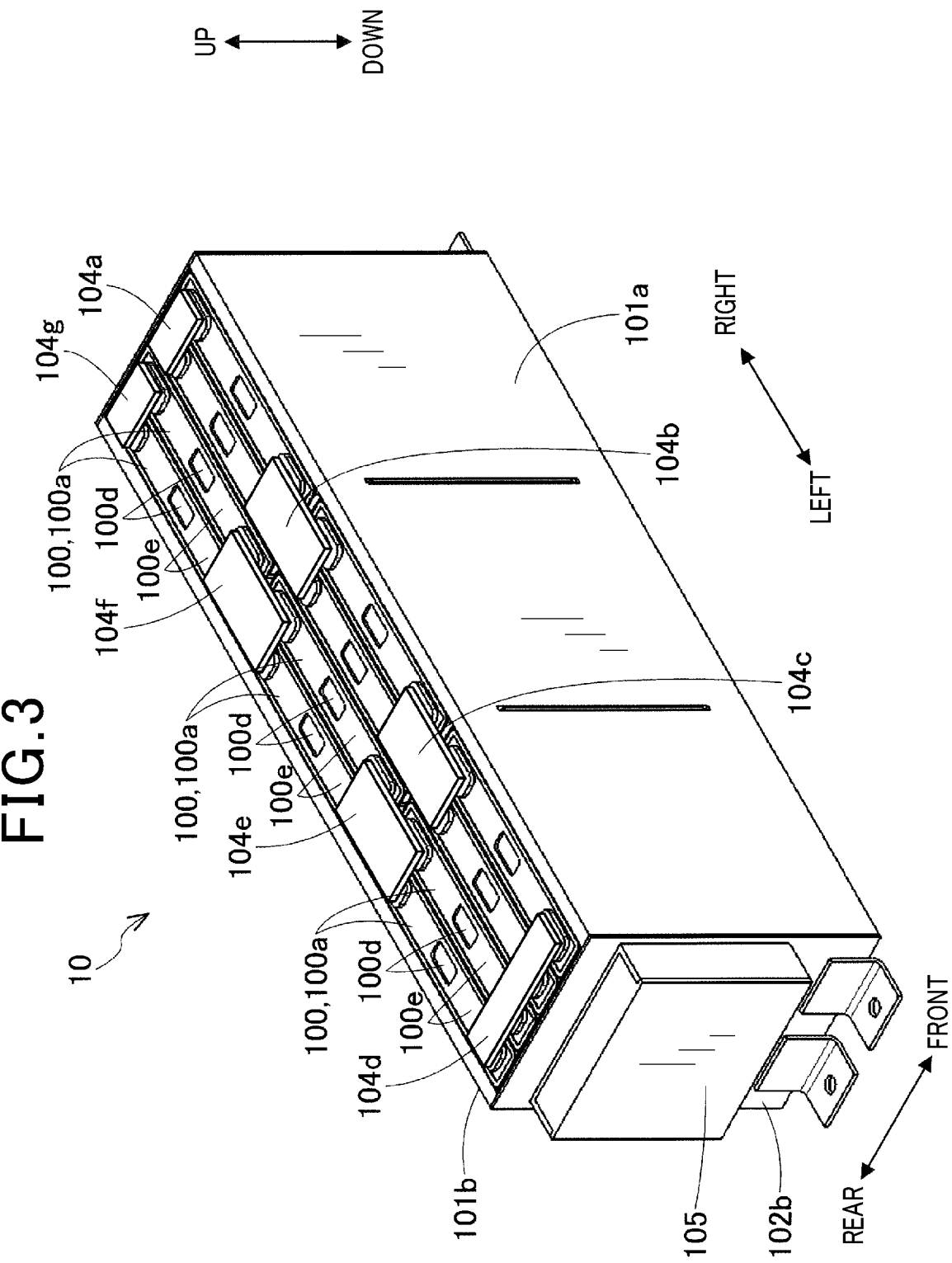
FIG. 3 is a perspective view of the battery module, omitting the restraining members therefrom.
Figure 6:
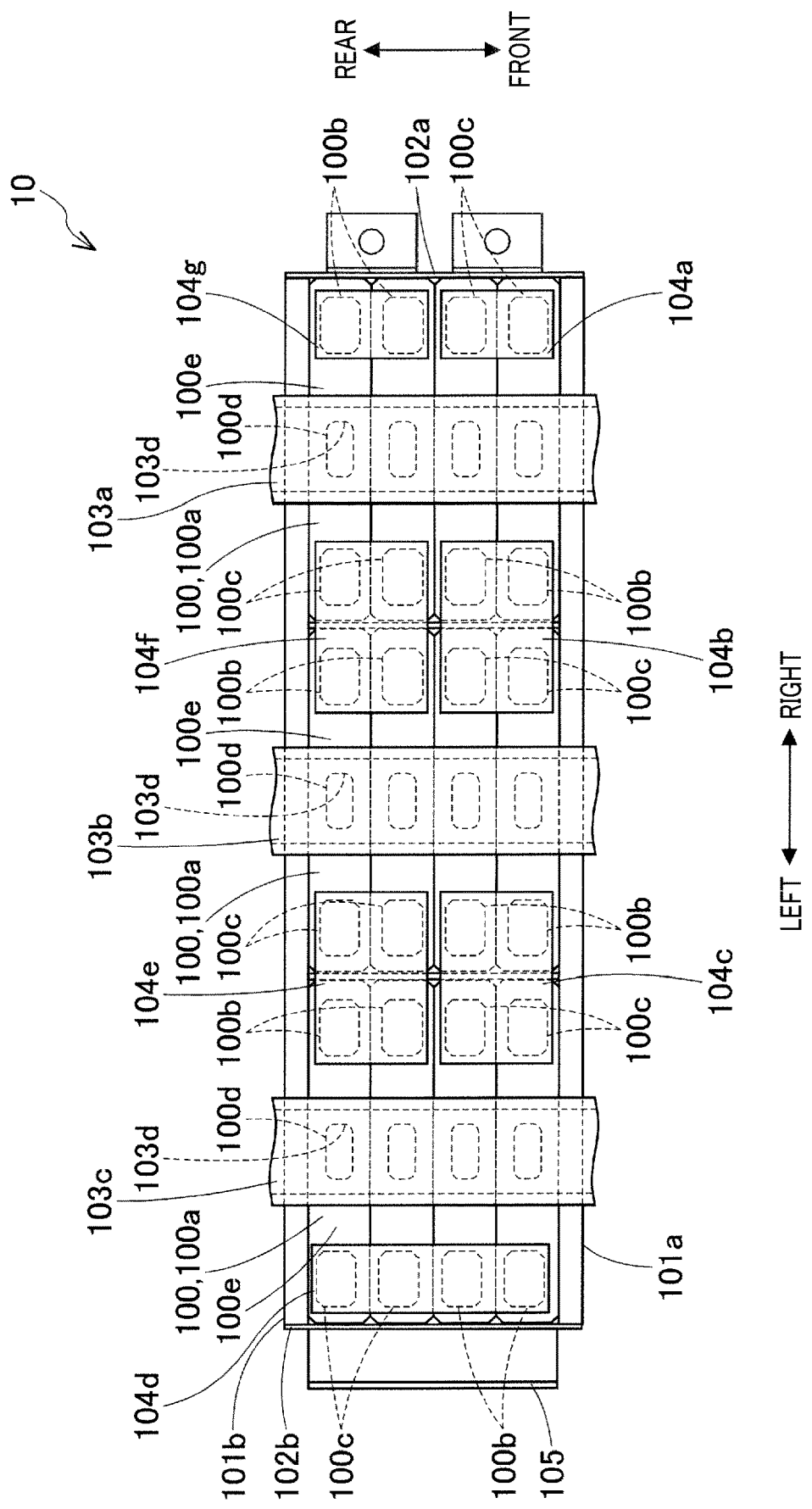
FIG. 6 is a top view of the battery module.
Figure 7:
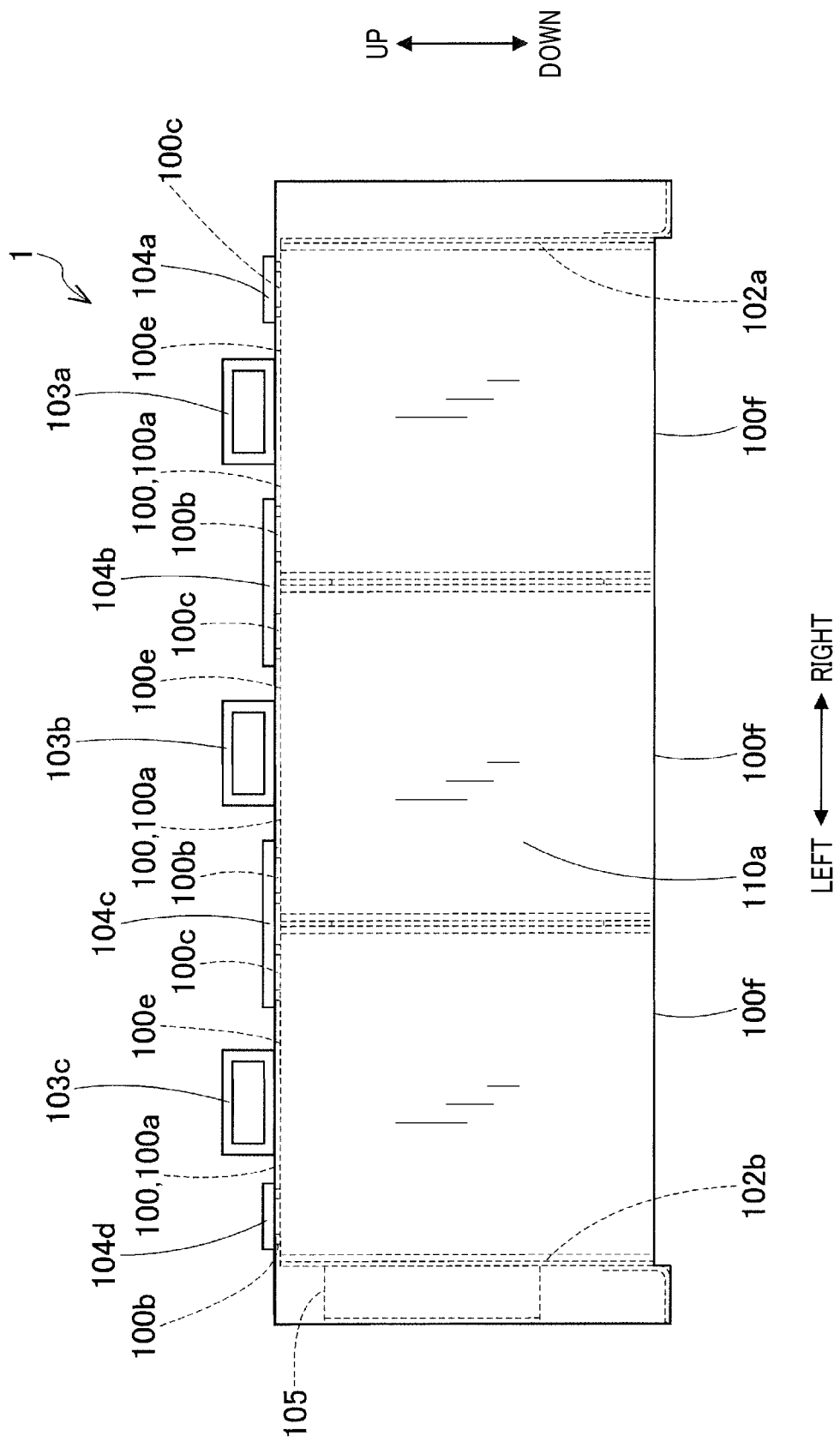
FIG. 7 is a front view of the battery pack according to the first embodiment.
Figure 8:
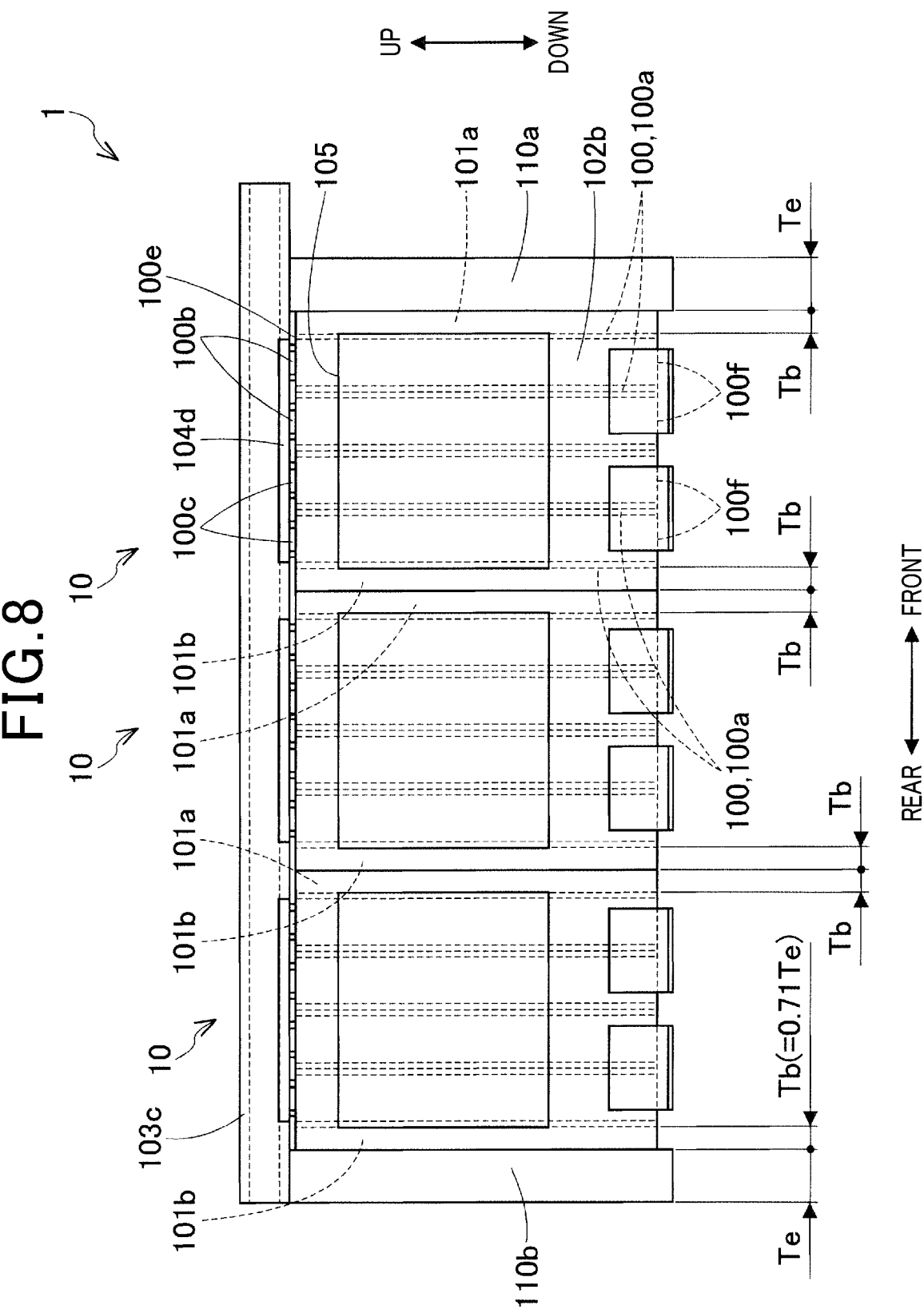
FIG. 8 is a side view of the battery pack according to the first embodiment.
Figure 9:
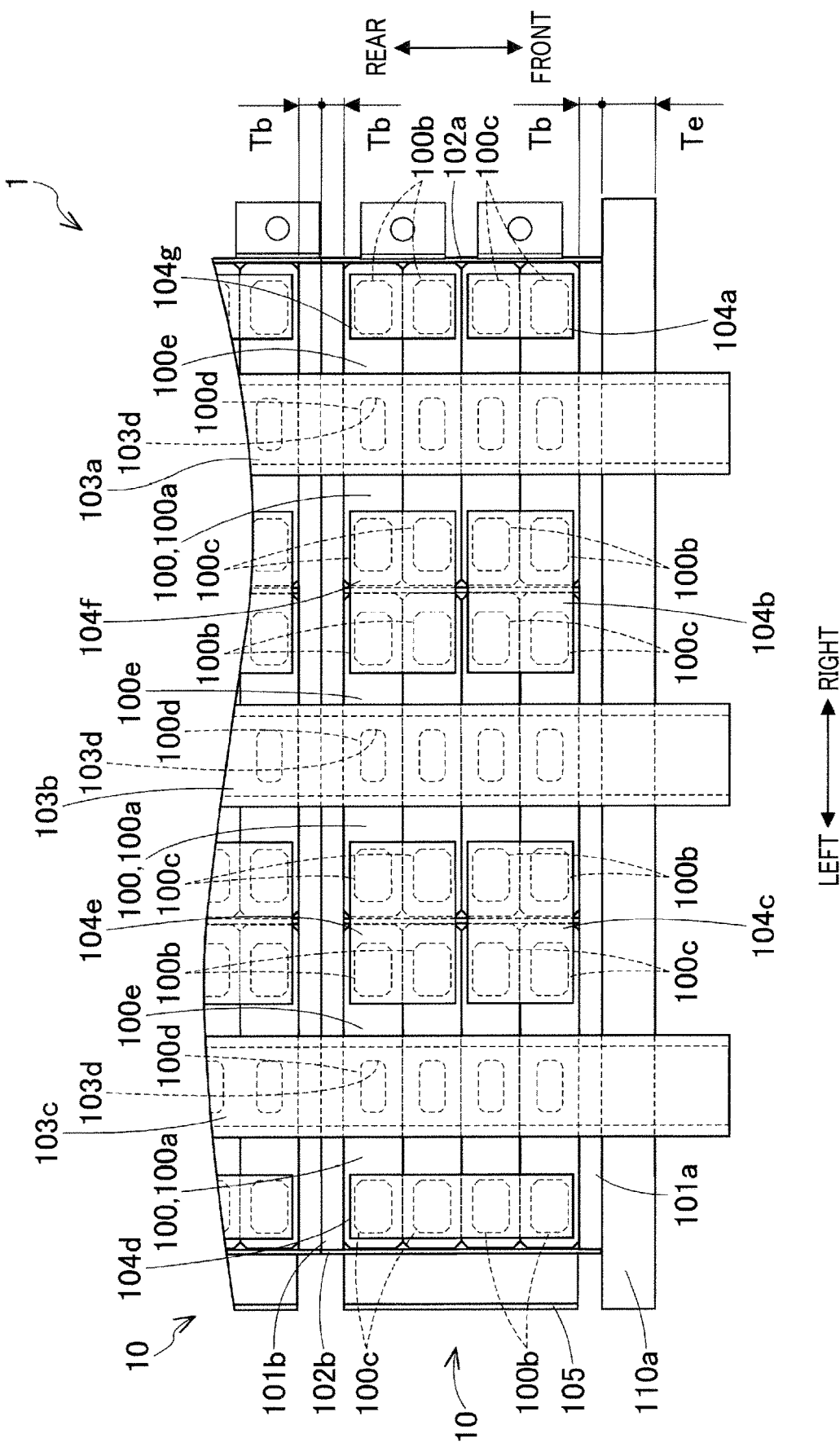
FIG. 9 is a top view of part of the battery pack according to the first embodiment.

More specifically, as shown in FIGS. 3 and 6, the busbar 104a electrically connects the negative terminals 100c of that pair of the battery cells 100 which is located at the front right corner of the battery module 10 to each other. The busbar 104b electrically connects all of the positive terminals 100b of that pair of the battery cells 100 which is located at the front right corner of the battery module 10 and the negative terminals 100c of that pair of the battery cells 100 which is located at the front center of the battery module 10 to each other. The busbar 104c electrically connects all of the positive terminals 100b of that pair of the battery cells 100 which is located at the front center of the battery module 10 and the negative terminals 100c of that pair of the battery cells 100 which is located at the front left corner of the battery module 10 to each other. The busbar 104d electrically connects all of the positive terminals 100b of that pair of the battery cells 100 which is located at the front left corner of the battery module 10 and the negative terminals 100c of that pair of the battery cells 100 which is located at the rear left corner of the battery module 10 to each other. The busbar 104e electrically connects all of the positive terminals 100b of that pair of the battery cells 100 which is located at the rear left corner of the battery module 10 and the negative terminals 100c of that pair of the battery cells 100 which is located at the rear center of the battery module 10 to each other. The battery module 104f electrically connects all of the positive terminals 100b of that pair of the battery cells 100 which is located at the rear center of the battery module 10 and the negative terminals 100c of that pair of the battery cells 100 which is located at the rear right corner of the battery module 10 to each other. The busbar 104g electrically connects the positive terminals 100b of that pair of the battery cells 100 which is located at the rear right corner of the battery module 10 to each other. In addition, the busbar 104a constitutes a negative terminal of the battery module 10 while the busbar 104g constitutes a positive terminal of the battery module 10.

In each of the battery modules 10, the voltage monitoring unit 105 is provided to monitor the voltage of each of the battery cells 100 of the battery module 10. The voltage monitoring unit 105 is fixed to the module side plate 102a which is located on the left side of the battery cells 100. In addition, though not shown in the figures, the voltage monitoring unit 105 is electrically connected to the busbars 104a-104g via wiring members.

As shown in FIGS. 1 and 7-9, in the battery pack 1 according to the present embodiment, the three battery modules 10 are arranged in alignment with each other in the front-rear direction. Moreover, the pair of pack end plates 110a and 110b are arranged respectively on the front and rear sides of the battery modules 10 to sandwich (or clamp)

the battery modules 10 therebetween, thereby keeping the dimension of the battery pack 1 in the front-rear direction constant. Specifically, each of the pack end plates 110a and 110b is formed, of the same metal material as the module end plates 101a and 101b of the battery modules 10, into the shape of a plate. Moreover, the pack end plate 110a is arranged to abut the module end plate 101a of that battery module 10 which is located most forward in all the three battery modules 10 while the pack end plate 110b is arranged to abut the module end plate 101b of that battery module 10 which is located most backward.

In the present embodiment, the strength of the pack end plates 110a and 110b in the front-rear direction is set to a minimum required strength to hold the battery modules 10 between the pack end plates 110a and 110b in a predetermined state where the battery cells 100 of the battery modules 10 have deteriorated (or in a predetermined state of health of the battery cells 100). Here, the minimum required strength is a strength with which: the pack end plates 110a and 110b are kept from being plastically deformed when a minimum load, which is required to hold the battery modules 10 between the pack end plates 110a and 110b in an initial state where the battery cells 100 of the battery modules 10 have not deteriorated, is applied to the pack end plates 110a and 110b in the front-rear direction; and the pack end plates 110a and 110b are kept from being plastically deformed also in the predetermined state where the battery cells 100 have deteriorated.

Moreover, in the present embodiment, the predetermined state is a state where the capacity deterioration ratio of the battery cells 100 of the battery modules 10 is equal to 20%. The capacity deterioration ratio is a parameter representing the rate of reduction in capacity of the battery cells 100. In the initial state where the battery cells 100 have not deteriorated, the capacity deterioration ratio is equal to 0%. The capacity deterioration ratio of 20% indicates that the capacities of the battery cells 100 have been reduced by 20% from the initial values thereof (i.e., the capacities of the battery cells 100 in the initial state where the battery cells 100 have not deteriorated). In addition, the capacity deterioration ratio of 20% also represents the operating limit of the battery cells 100.

Figure 10:
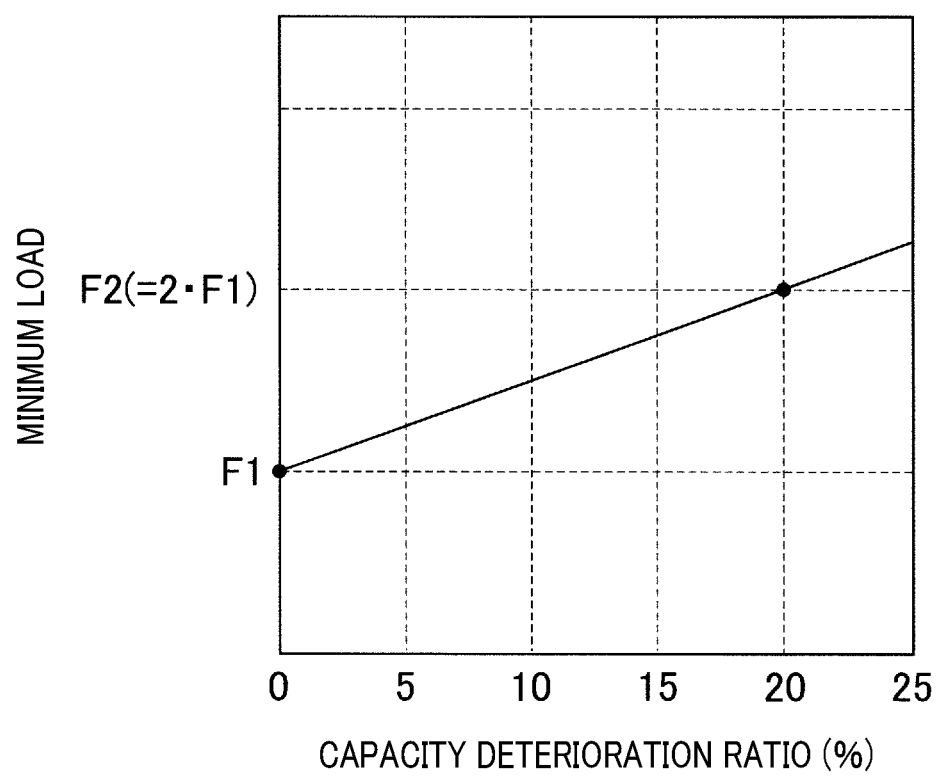
FIG. 10 is a graph illustrating the relationship between the capacity deterioration ratio of battery cells and the minimum load required to hold the battery cells in the battery pack.

FIG. 10 illustrates the relationship between the capacity deterioration ratio of the battery cells 100 of the battery modules 10 and the minimum load required to be applied to the pack end plates 110a and 110b in the front-rear direction to hold the battery modules 10 between the pack end plates 110a and 110b.

As can be seen from FIG. 10, $F2=2 \times F1$, where F2 is the minimum load required to be applied to the pack end plates 110a and 110b to hold the battery modules 10 between the pack end plates 110a and 110b in the predetermined state where the capacity deterioration ratio of the battery cells 100 of the battery modules 10 is equal to 20%, and F1 is the minimum load required to be applied to the pack end plates 110a and 110b to hold the battery modules 10 between the pack end plates 110a and 110b in the initial state where the capacity deterioration ratio of the battery cells 100 is equal to 0%. Here, the increase in the minimum load with increase in the capacity deterioration ratio is due to the swelling of the battery cells 100 with deterioration.

It can be seen from FIG. 10 that to hold the battery modules 10 between the pack end plates 110a and 110b in the predetermined state, it is required for the pack end plates 110a and 110b to have a strength with which it is possible to withstand $2 \times F1$ (i.e., twice the minimum load required to be applied to the pack end plates 110a and 110b to hold the battery modules 10 between the pack end plates 110a and 110b in the initial state).

Accordingly, the minimum required strength of the pack end plates 110a and 110b to hold the battery modules 10 between the pack end plates 110a and 110b in the predetermined state is twice the minimum required strength of the pack end plates 110a and 110b to hold the battery modules 10 between the pack end plates 110a and 110b in the initial state. In other words, the minimum required strength of the pack end plates 110a and 110b to hold the battery modules 10 between the pack end plates 110a and 110b in the predetermined state is twice the minimum strength required to keep the pack end plates 110a and 110b from being plastically deformed when the minimum load F1, which is required to hold the battery modules 10 between the pack end plates 110a and 110b in the initial state, is applied to the pack end plates 110a and 110b in the front-rear direction.

As above, in the present embodiment, it is possible to hold all the battery cells 100 of the battery modules 10 in the battery pack 1 by the pack end plates 110a and 110b until the battery cells 100 have deteriorated to cause the capacity deterioration ratio to become 20%. Therefore, it is sufficient for the module end plates 101a and 101b of each of the battery modules 10 to have a strength with which it is possible to withstand the minimum load required to be applied to hold the battery cells 100 of the battery module 10 between the module end plates 101a and 101b. Accordingly, in the present embodiment, the strength of the module end plates 101a and 101b in the front-rear direction is set to be lower than the strength of the pack end plates 110a and 110b in the front-rear direction. Specifically, the strength of the module end plates 101a and 101b in the front-rear direction is set to the minimum strength required to hold the battery cells 100 between the module end plates 101a and 101b in the initial state where the battery cells 100 have not deteriorated. In other words, the strength of the module end plates 101a and 101b in the front-rear direction is set to the minimum strength required to keep the module end plates 101a and 101b from being plastically deformed when the minimum load, which is required to hold the battery cells 100 between the module end plates 101a and 101b in the initial state, is applied to the module end plates 101a and 101b in the front-rear direction. That is, in the present embodiment, the strength of the module end plates 101a and 101b in the front-rear direction is set to be ½ of (i.e., 0.5 times) the strength of the pack end plates 110a and 110b in the front-rear direction.

Moreover, in the present embodiment, as described previously, the module end plates 101a and 101b are formed of the same metal material as the pack end plates 110a and 110b. Therefore, the strength of the module end plates 101a and 101b and the strength of the pack end plates 110a and 110b in the front-rear direction are adjusted by adjusting the thickness Tb of the module end plates 101a and 101b and the thickness Te of the pack end plates 110a and 110b in the front-rear direction. More specifically, the strength of the module end plates 101a and 101b in the front-rear direction is proportional to the square of the thickness Tb of the module end plates 101a and 101b; and the strength of the pack end plates 110a and 110b in the front-rear direction is proportional to the square of the thickness Te of the pack end plates 110a and 110b. Accordingly, to set the strength of the module end plates 101a and 101b in the front-rear direction to be ½ of the strength of the pack end plates 110a and 110b in the front-rear direction, the thickness Tb of the module end plates 101*a* and 101*b* is set to be √(½) times (i.e., about 0.71 times) the thickness Te of the pack end plates 110*a* and 110*b*.

In addition, in the present embodiment, as described previously, the restraining members 103*a*-103*c* are each fixed to the pack end plates 110*a* and 110*b*, thereby restraining the pack end plates 110*a* and 110*b*. Consequently, all the module end plates 101*a* and 101*b* of the battery modules 10 are restrained by the pack end plates 110*a* and 110*b* that are restrained by the restraining members 103*a*-103*c*. That is, the restraining members 103*a*-103*c* are each fixed to the pack end plates 110*a* and 110*b* to restrain the pack end plates 110*a* and 110*b* and thus restrain all the module end plates 101*a* and 101*b* of the battery modules 10 via the pack end plates 110*a* and 110*b*.

The above-described battery pack 1 according to the present embodiment has the following advantages.

In the present embodiment, the battery pack 1 includes the three battery modules 10 and the pair of pack end plates 110*a* and 110*b*. The battery modules 10 are arranged in alignment with each other in the front-rear direction (i.e., a predetermined direction). Each of the battery modules 10 includes the twelve battery cells 100 and the pair of module end plates 101*a* and 101*b*. Every four of the twelve battery cells 100 are arranged in alignment with each other in the front-rear direction. The module end plates 101*a* and 101*b* are arranged to hold all the twelve battery cells 100 therebetween in the front-rear direction and thereby keep the dimension of the battery module 10 in the front-rear direction constant. The module end plate 101*a* abuts those three battery cells 100 which are located most forward in all the twelve battery cells 100 while the module end plate 101*b* abuts those three battery cells 100 which are located most backward. The pack end plates 110*a* and 110*b* are arranged to hold the three battery modules 10 therebetween in the front-rear direction and thereby keep the dimension of the battery pack 1 in the front-rear direction constant. The pack end plate 110*a* abuts the module end plate 101*a* of that battery module 10 which is located most forward in all the three battery modules 10 while the pack end plate 110*b* abuts the module end plate 101*b* of that battery module 10 which is located most backward. The strength of the pack end plates 110*a* and 110*b* in the front-rear direction is set to the minimum required strength to hold the battery modules 10 between the pack end plates 110*a* and 110*b* in the predetermined state where the battery cells 100 of the battery modules 10 have deteriorated. The strength of the module end plates 101*a* and 101*b* of the battery modules 10 in the front-rear direction is set to be lower than the strength of the pack end plates 110*a* and 110*b* in the front-rear direction.

With the above configuration, in the predetermined state where the battery cells 100 of the battery modules 10 swell due to the deterioration thereof, it is still possible to hold all the battery cells 100 of the battery modules 10 in the battery pack 1 by the pack end plates 110*a* and 110*b*. Consequently, it becomes possible to set the strength of the module end plates 101*a* and 101*b* of the battery modules 10 in the front-rear direction to be lower than the strength of the pack end plates 110*a* and 110*b* in the front-rear direction. As a result, it becomes possible to reduce the size (more specifically, the thickness Tb) of the module end plates 101*a* and 101*b* of the battery modules 10. Accordingly, it becomes possible to minimize the size of the battery pack 1 while ensuring high capability thereof to cope with the swelling of the battery cells 100 with deterioration.

Moreover, in the present embodiment, the minimum required strength is a strength with which: the pack end plates 110*a* and 110*b* are kept from being plastically deformed when the minimum load F1, which is required to hold the battery modules 10 between the pack end plates 110*a* and 110*b* in the initial state where the battery cells 100 of the battery modules 10 have not deteriorated, is applied to the pack end plates 110*a* and 110*b* in the front-rear direction; and the pack end plates 110*a* and 110*b* are kept from being plastically deformed also in the predetermined state where the battery cells 100 have deteriorated.

Consequently, setting the strength of the pack end plates 110*a* and 110*b* in the front-rear direction to the minimum required strength as above, in the predetermined state where the battery cells 100 have deteriorated, it is still possible to keep the pack end plates 110*a* and 110*b* from being plastically deformed, thereby reliably holding all the battery cells 100 of the battery modules 10 between the pack end plates 110*a* and 110*b*.

Furthermore, in the present embodiment, the minimum required strength is twice the minimum strength required to keep the pack end plates 110*a* and 110*b* from being plastically deformed when the minimum load F1, which is required to hold the battery modules 10 between the pack end plates 110*a* and 110*b* in the initial state, is applied to the pack end plates 110*a* and 110*b* in the front-rear direction. That is, the minimum required strength is the minimum strength required to keep the pack end plates 110*a* and 110*b* from being plastically deformed when the minimum load F2, which is required to hold the battery modules 10 between the pack end plates 110*a* and 110*b* in the predetermined state where the capacity deterioration ratio of the battery cells 100 of the battery modules 10 is equal to 20%, is applied to the pack end plates 110*a* and 110*b* in the front-rear direction. In addition, as described previously, the capacity deterioration ratio of 20% represents the operating limit of the battery cells 100.

Consequently, setting the strength of the pack end plates 110*a* and 110*b* in the front-rear direction to the minimum required strength as above, in the predetermined state where the battery cells 100 have deteriorated to the operating limit thereof, it is still possible to keep the pack end plates 110*a* and 110*b* from being plastically deformed, thereby reliably holding all the battery cells 100 of the battery modules 10 between the pack end plates 110*a* and 110*b*.

In the present embodiment, the strength of the module end plates 101*a* and 101*b* of the battery modules 10 in the front-rear direction is set to the minimum strength required to keep the module end plates 101*a* and 101*b* from being plastically deformed when the minimum load, which is required to hold the battery cells 100 between the module end plates 101*a* and 101*b* in the initial state where the battery cells 100 have not deteriorated, is applied to the module end plates 101*a* and 101*b* in the front-rear direction.

Consequently, the strength of the module end plates 101*a* and 101*b* of the battery modules 10 in the front-rear direction is set to be only ½ of the strength of the pack end plates 110*a* and 110*b* in the front-rear direction. As a result, it becomes possible to effectively reduce the size (more specifically, the thickness Tb) of the module end plates 101*a* and 101*b* of the battery modules 10. In addition, it is also possible to reliably hold the battery cells 100 between the module end plates 101*a* and 101*b* in the initial state where the battery cells 100 have not deteriorated.

In the present embodiment, the module end plates 101*a* and 101*b* of the battery modules 10 are formed of the same metal material as the pack end plates 110*a* and 110*b* and have the thickness Tb in the front-rear direction smaller than (more specifically, about 0.71 times) the thickness Te of the pack end plates 110a and 110b in the front-rear direction.

With the above configuration, it becomes possible to reliably reduce the size (more specifically, the dimension in the front-rear direction) of the battery pack 1.

In the present embodiment, the predetermined state is defined as a state where the capacity deterioration ratio of the battery cells 100 of the battery modules 10 is equal to 20%, i.e., the capacities of the battery cells 100 have been reduced by 20% from the initial values thereof. In addition, as described previously, the capacity deterioration ratio of 20% represents the operating limit of the battery cells 100.

Consequently, defining the predetermined state as above, it becomes possible to hold all the battery cells 100 of the battery modules 10 between the pack end plates 110a and 110b until the battery cells 100 have deteriorated to the operating limit thereof.

In the present embodiment, the battery pack 1 includes the restraining members 103a-103c that are each fixed to the pack end plates 110a and 110b to restrain the pack end plates 110a and 110b and thus restrain all the module end plates 101a and 101b of the battery modules 10 via the pack end plates 110a and 110b.

With the restraining members 103a-103c, the load required to hold the battery modules 10 between the pack end plates 110a and 110b can be reliably applied to the pack end plates 110a and 110b and the load required to hold the battery cells 100 between the module end plates 101a and 101b can be reliably applied to the module end plates 101a and 101b.

Modifications of First Embodiment

In the previous embodiment, the module end plates 101a and 101b of the battery modules 10 are formed of the same metal material as the pack end plates 110a and 110b. The strength of the module end plates 101a and 101b in the front-rear direction is set to be lower than the strength of the pack end plates 110a and 110b in the front-rear direction by setting the thickness Tb of the module end plates 101a and 101b in the front-rear direction to be smaller than the thickness Te of the pack end plates 110a and 110b in the front-rear direction (see FIG. 8).

Figure 11:
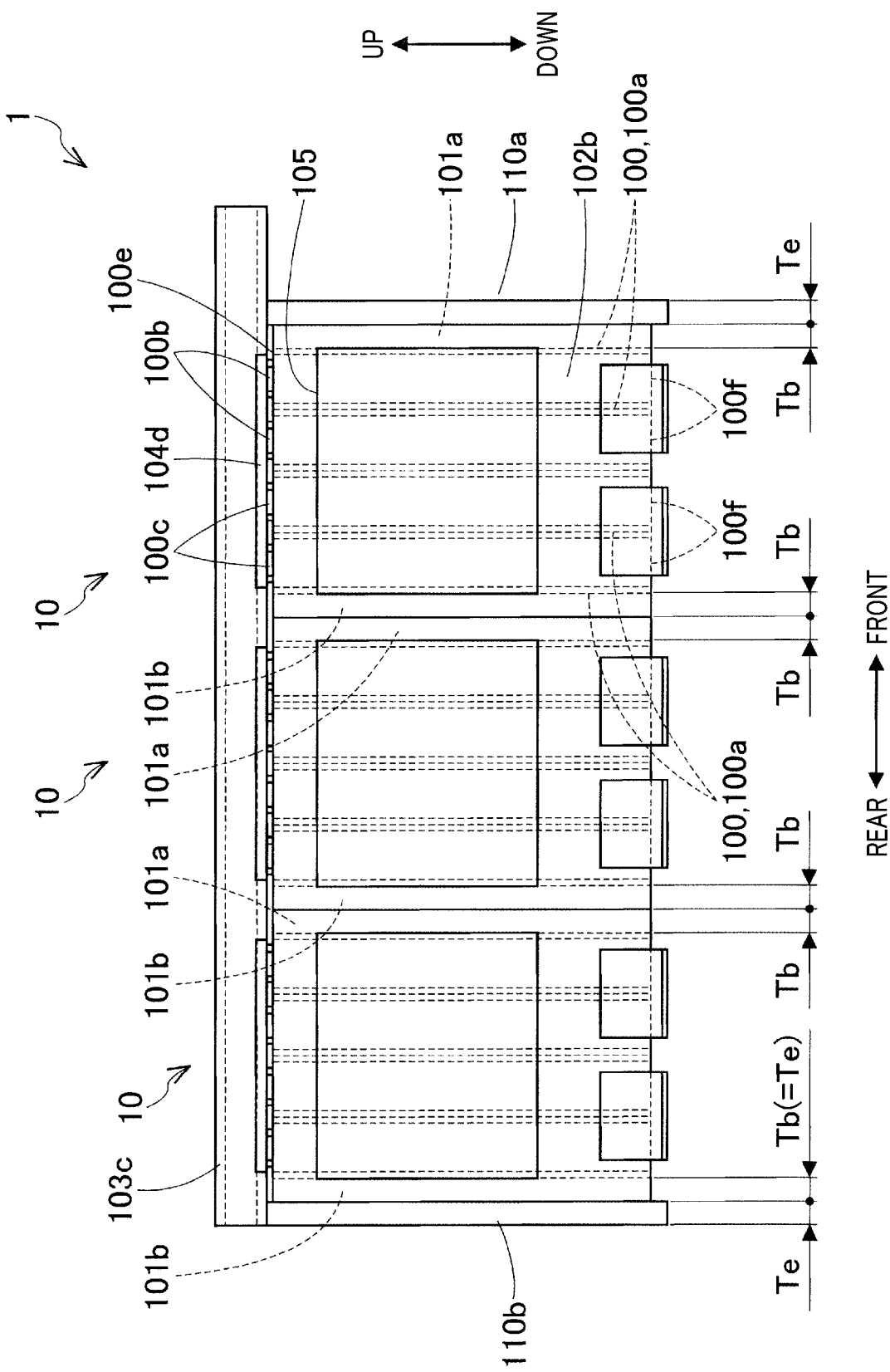
FIG. 11 is a side view of a battery pack according to a first modification of the first embodiment.

Alternatively, as shown in FIG. 11, the thickness Tb of the module end plates 101a and 101b of the battery modules 10 in the front-rear direction may be set to be equal to the thickness Te of the pack end plates 110a and 110b in the front-rear direction. In this case, the strength of the module end plates 101a and 101b in the front-rear direction can be set to be lower than the strength of the pack end plates 110a and 110b in the front-rear direction by forming the module end plates 101a and 101b with a first metal material and forming the pack end plates 110a and 110b with a second metal material which has a lower strength than the first metal material.

In the previous embodiment, all of the module end plates 101a and 101b of the battery modules 10 and the pack end plates 110a and 110b are formed of the same metal material. Alternatively, all of the module end plates 101a and 101b of the battery modules 10 and the pack end plates 110a and 110b may be formed of the same resin material.

In the previous embodiment, the strength of the pack end plates 110a and 110b in the front-rear direction is set to the minimum required strength to hold the battery modules 10 between the pack end plates 110a and 110b in the predetermined state where the battery cells 100 of the battery modules 10 have deteriorated. Alternatively, the strength of the pack end plates 110a and 110b in the front-rear direction may be set to be higher than the minimum required strength to hold the battery modules 10 between the pack end plates 110a and 110b in the predetermined state.

Figure 12:
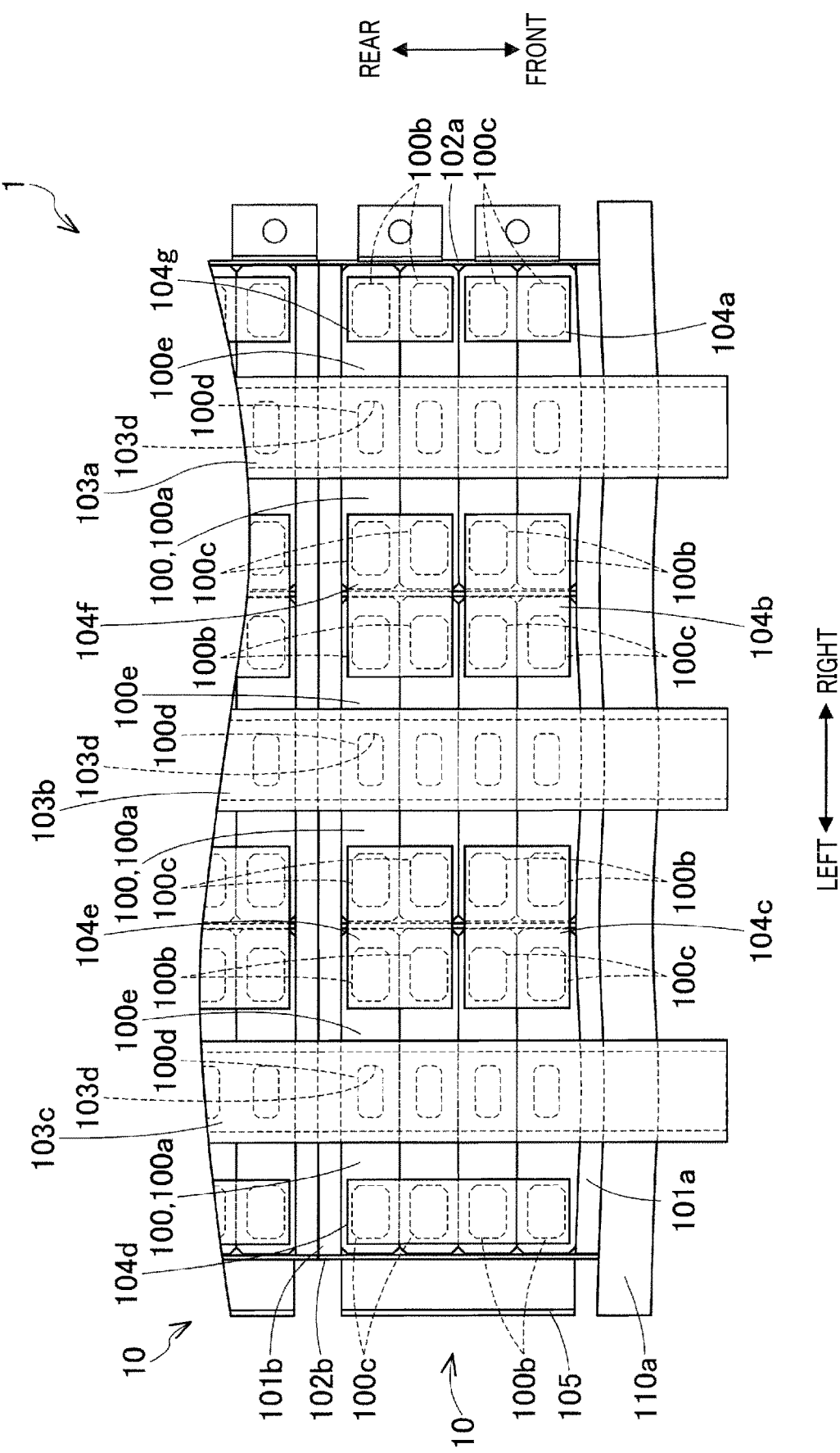
FIG. 12 is a top view of part of a battery pack according to a second modification of the first embodiment.

In the previous embodiment, the minimum required strength is a strength with which: the pack end plates 110a and 110b are kept from being plastically deformed when the minimum load F1, which is required to hold the battery modules 10 between the pack end plates 110a and 110b in the initial state where the battery cells 100 of the battery modules 10 have not deteriorated, is applied to the pack end plates 110a and 110b in the front-rear direction; and the pack end plates 110a and 110b are kept from being plastically deformed also in the predetermined state where the battery cells 100 have deteriorated. Therefore, provided that the strength of the pack end plates 110a and 110b in the front-rear direction is higher than or equal to the minimum required strength, the pack end plates 110a and 110b may be elastically deformed as shown in FIG. 12. In this case, the pack end plates 110a and 110b may be formed of an elastic material such as rubber.

In the previous embodiment, the strength of the pack end plates 110a and 110b in the front-rear direction is set to the minimum required strength to hold the battery modules 10 between the pack end plates 110a and 110b in the predetermined state where the battery cells 100 of the battery modules 10 have deteriorated; the minimum required strength is twice the minimum strength required to keep the pack end plates 110a and 110b from being plastically deformed when the minimum load F1, which is required to hold the battery modules 10 between the pack end plates 110a and 110b in the initial state, is applied to the pack end plates 110a and 110b in the front-rear direction. That is, in the previous embodiment, the strength of the pack end plates 110a and 110b in the front-rear direction is set to be twice the minimum strength required to keep the pack end plates 110a and 110b from being plastically deformed when the minimum load F1, which is required to hold the battery modules 10 between the pack end plates 110a and 110b in the initial state, is applied to the pack end plates 110a and 110b in the front-rear direction. Alternatively, the strength of the pack end plates 110a and 110b in the front-rear direction may be set to be higher than twice the minimum strength required to keep the pack end plates 110a and 110b from being plastically deformed when the minimum load F1, which is required to hold the battery modules 10 between the pack end plates 110a and 110b in the initial state, is applied to the pack end plates 110a and 110b in the front-rear direction.

Figure 13:
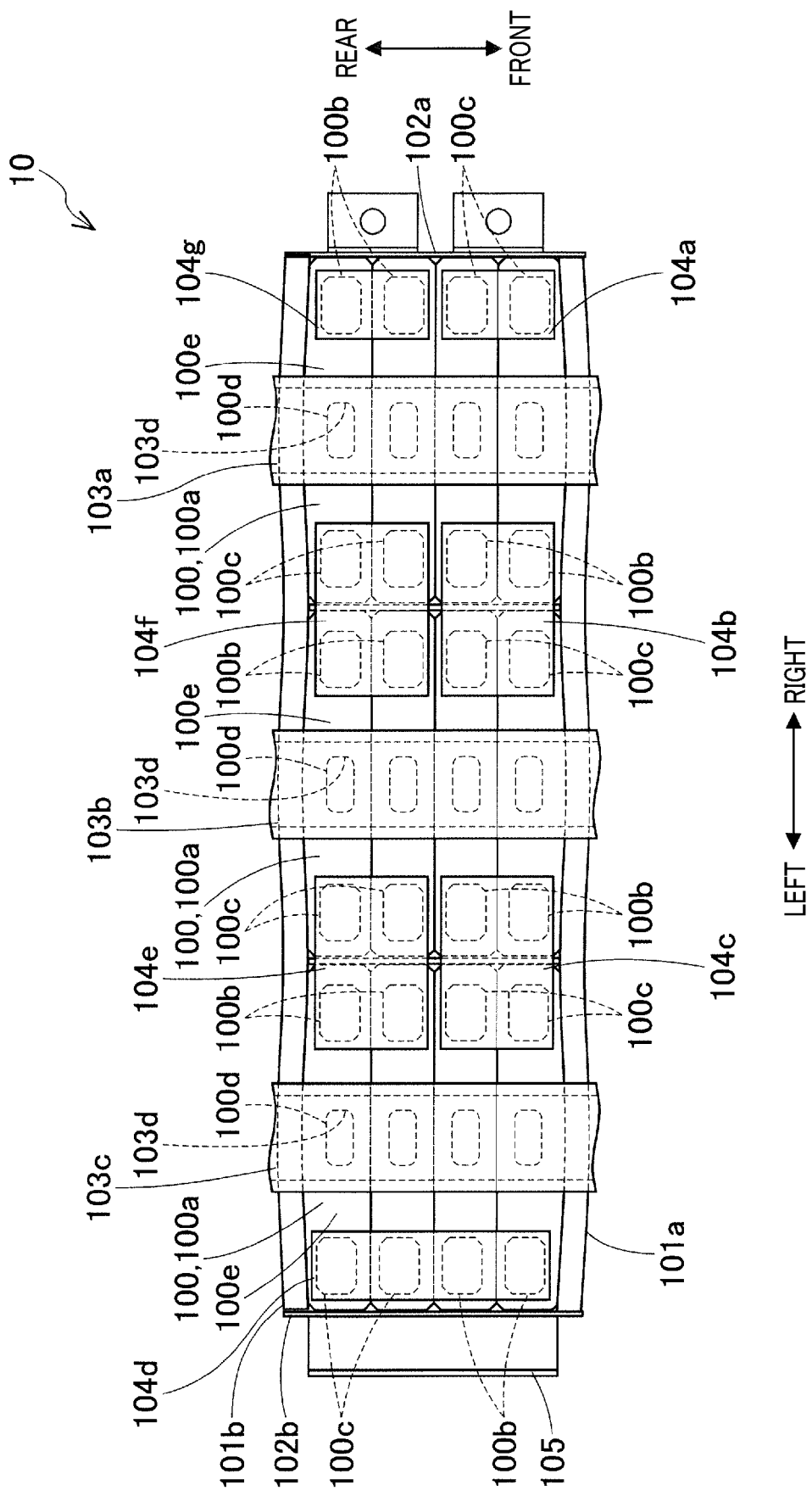
FIG. 13 is a top view of one of battery modules of a battery pack according to a third modification of the first embodiment.

In the previous embodiment, the strength of the module end plates 101a and 101b of the battery modules 10 in the front-rear direction is set to the minimum strength required to keep the module end plates 101a and 101b from being plastically deformed when the minimum load, which is required to hold the battery cells 100 between the module end plates 101a and 101b in the initial state where the battery cells 100 have not deteriorated, is applied to the module end plates 101a and 101b in the front-rear direction. Alternatively, to the extent of being lower than the strength of the pack end plates 110a and 110b in the front-rear direction, the strength of the module end plates 101a and 101b in the front-rear direction may be set to be higher than the minimum strength required to keep the module end plates 101a and 101b from being plastically deformed when the minimum load, which is required to hold the battery cells 100 between the module end plates 101a and 101b in the initial state, is applied to the module end plates 101a and 101*b* in the front-rear direction. Furthermore, provided that the strength of the module end plates 101*a* and 101*b* in the front-rear direction is higher than or equal to the aforementioned minimum strength, the module end plates 101*a* and 101*b* may be elastically deformed as shown in FIG. 13. In this case, the module end plates 101*a* and 101*b* may be formed of an elastic material such as rubber.

In the previous embodiment, each of the battery modules 10 includes the twelve battery cells 100, every four of which are arranged in alignment with each other in the front-rear direction. Alternatively, each of the battery modules 10 may have any plural number of battery cells 100 arranged in alignment with each other in the front-rear direction.

In the previous embodiment, the battery pack 1 has the three battery modules 10 arranged in alignment with each other in the front-rear direction. Alternatively, the battery pack 1 may have any plural number of battery modules 10 arranged in alignment with each other in the front-rear direction.

Figure 14:
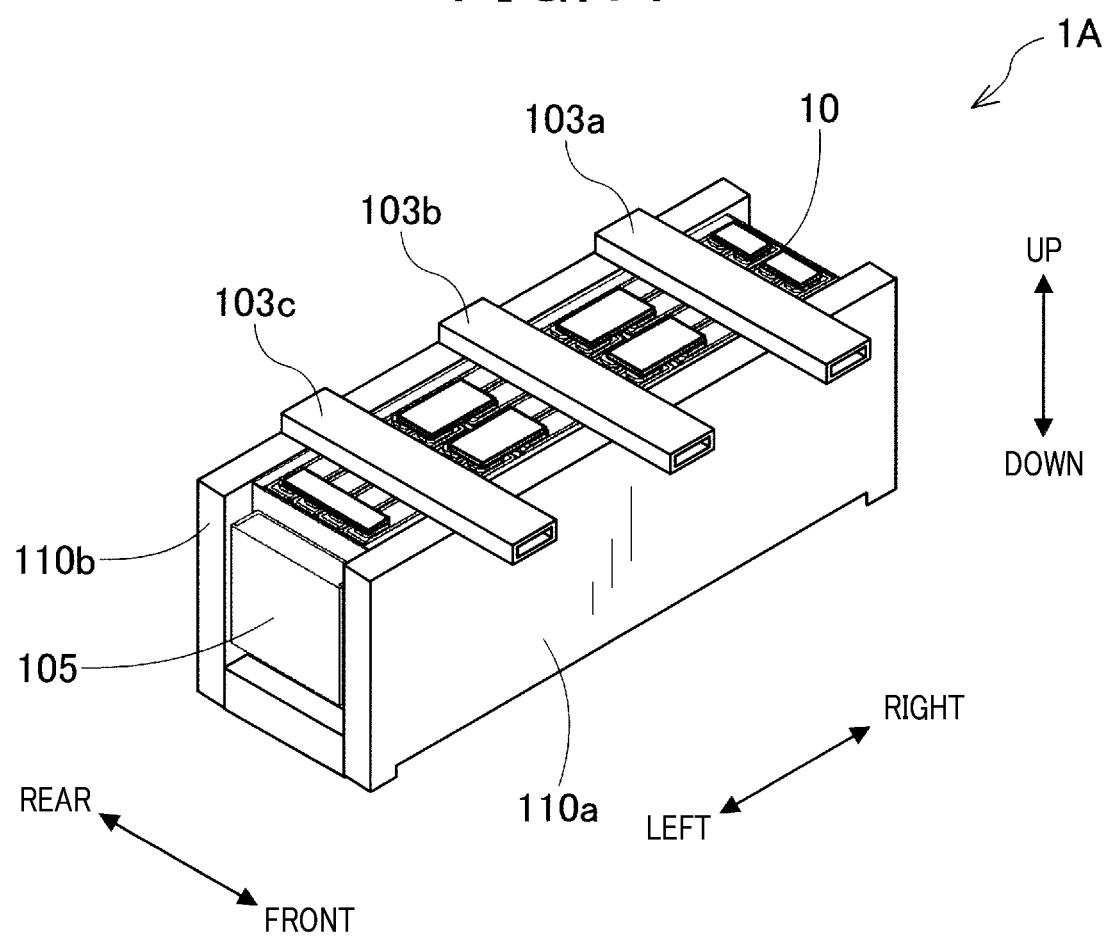
FIG. 14 is a perspective view of a battery pack according to a fourth modification of the first embodiment.

Furthermore, as shown in FIG. 14, the battery pack 1 may alternatively include only a single battery module 10. In this case, the pack end plate 110*a* abuts the module end plate 101*a* of the battery module 10 which is located at the front end of the battery module 10 while the pack end plate 110*b* abuts the module end plate 101*b* of the battery module 10 which is located at the rear end of the battery module 10. In addition, in this case, the length of the restraining members 103*a*-103*c* in the front-rear direction is accordingly reduced.

Moreover, though not shown in the figures, the battery pack 1 may have a plurality of battery modules 10 arranged in alignment with each other in the left-right direction. In this case, the pack end plates 110*a* and 110*b* are arranged respectively on the front and rear sides of the battery modules 10 to sandwich (or clamp) the battery modules 10 therebetween. More specifically, the pack end plate 110*a* abuts all the module end plates 101*a* of the battery modules 10 while the pack end plate 110*b* abuts all the module end plates 101*b* of the battery modules 10.

Second Embodiment

A battery pack 2 according to a second embodiment has a similar configuration to the battery pack 1 according to the first embodiment. Accordingly, only the differences of the battery pack 2 from the battery pack 1 will be described hereinafter with reference to FIGS. 15 and 16.

In the present embodiment, the battery pack 2 is mounted in a motor vehicle to supply DC power to, for example, electronic devices (not shown) provided in the vehicle.

Figure 15:
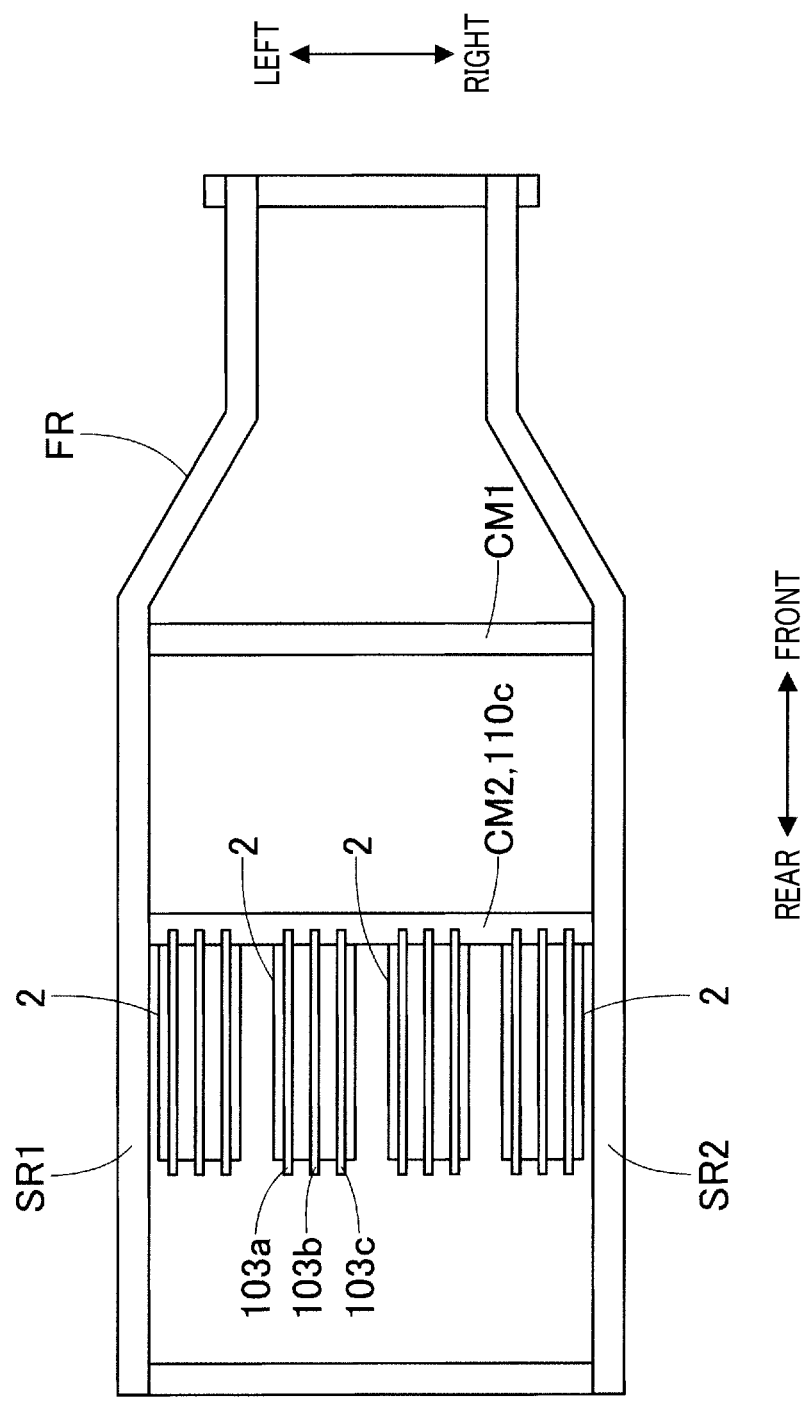
FIG. 15 is a top view of a vehicle frame and a battery pack according to a second embodiment, the battery pack being mounted in a motor vehicle.
Figure 16:
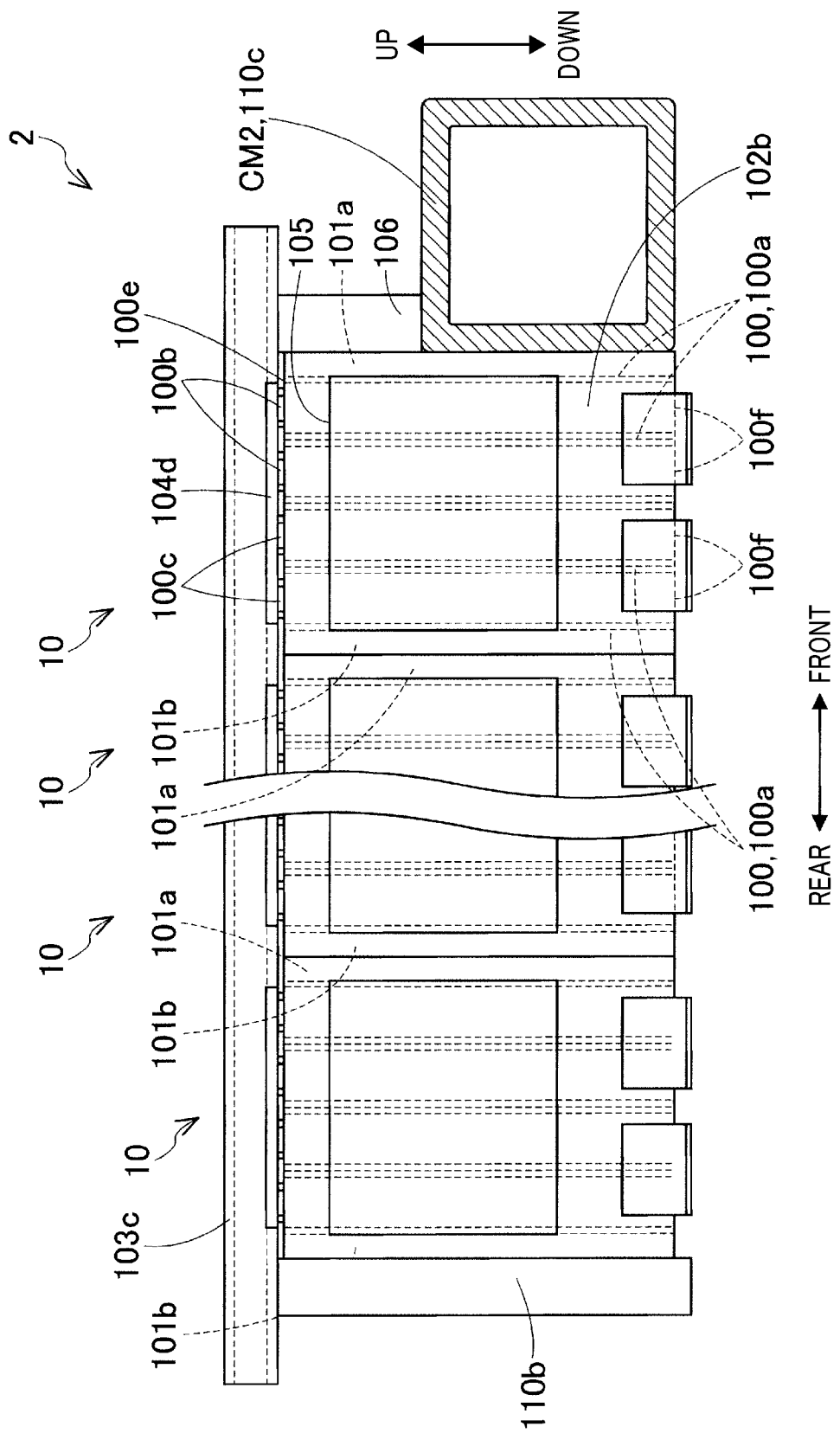
FIG. 16 is a side view of the battery pack according to the second embodiment.

It should be noted that FRONT, REAR, LEFT, RIGHT, UP and DOWN in FIGS. 15 and 16 respectively indicate the front, rear, left, right, upper and lower sides from the point of view of a driver of the vehicle facing forward.

As shown in FIG. 15, a vehicle frame FR, to which the battery pack 2 is mounted, includes a pair of side rails SR1 and SR2 and a pair of cross members CM1 and CM2.

The side rails SR1 and SR2 each extend in the front-rear direction (or longitudinal direction of the vehicle) and are spaded from each other at a given interval in the left-right direction (or lateral direction of the vehicle). The side rails SR1 and SR2 are formed of metal and shaped in a square tube (or tube with a square cross section).

On the other hand, the cross members CM1 and CM2 each extend in the left-right direction to connect the side rails SR1 and SR2. The cross members CM1 and CM2 are provided in the vicinity of a center position of the side rails SR1 and SR2 in the front-rear direction and spaded from each other at a given interval in the front-rear direction. The cross members CM1 and CM2 are also formed of metal and shaped in a square tube.

As shown in FIGS. 15 and 16, the battery pack 2 is a battery module assembly which is obtained by connecting a plurality of battery modules 10. Specifically, the battery pack 2 includes a plurality of battery modules 10, a pair of pack end plates 110*b* and 110*c*, a plurality of restraining members 103*a*-103*c* and a fixing member 106.

The battery modules 10 are arranged in alignment with each other in the front-rear direction (i.e., a predetermined direction).

The pack end plate 110*b* is identical to the pack end plate 110*b* described in the first embodiment.

The pack end plate 110*c* performs the same function as the pack end plate 110*a* described in the first embodiment. In the present embodiment, the pack end plate 110*c* is constituted of the cross member CM2 of the vehicle frame FR. As shown in FIG. 16, the pack end plate 110*c* (i.e., the cross member CM2) is arranged to abut the module end plate 101*a* of that battery module 10 which is located most forward in all the battery modules 10. Specifically, the pack end plate 110*c* is arranged to abut a lower part of a front surface of the module end plate 101*a*. More specifically, the pack end plate 110*c* abuts 50% or more of the front surface of the module end plate 101*a*. In addition, the pack end plate 110*c* has a strength in the front-rear direction higher than or equal to the strength of the pack end plate 110*a* described in the first embodiment.

The fixing member 106 is provided to fix the restraining members 103*a*-103*c* to the pack end plate 110*c* (i.e., the cross member CM2).

The restraining members 103*a*-103*c* are each fixed to the pack end plate 110*c* via the fixing member 106 and fixed directly to the pack end plate 110*b*. Consequently, the restraining members 103*a*-103*c* restrain the pack end plates 110*b* and 110*c* and thus restrain all the module end plates 101*a* and 101*b* of the battery modules 10 via the pack end plates 110*b* and 110*c*.

The battery pack 2 has the same advantages as the battery pack 1 according to the first embodiment.

Moreover, in the present embodiment, the pack end plate 110*c* is constituted of the cross member CM2 already existing in the vehicle. That is, no additional member is employed for constituting the pack end plate 110*c*. Consequently, it becomes possible to reduce the parts count and thus the manufacturing cost of the battery pack 2. Moreover, it also becomes possible to reduce the space required to mount the battery pack 2 in the vehicle.

Modification of Second Embodiment

Figure 17:
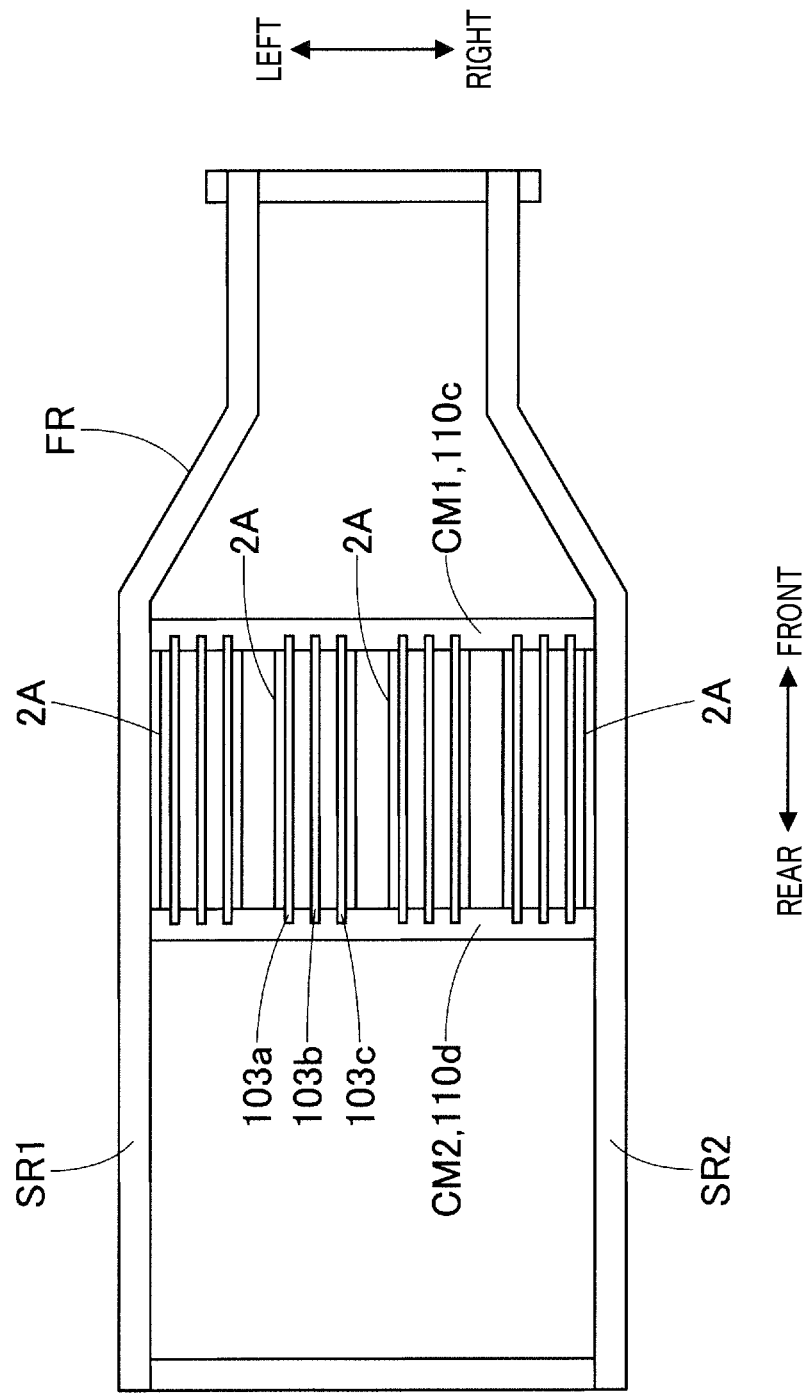
FIG. 17 is a top view of a vehicle frame and a battery pack according to a modification of the second embodiment, the battery pack being mounted in a motor vehicle.
Figure 18:
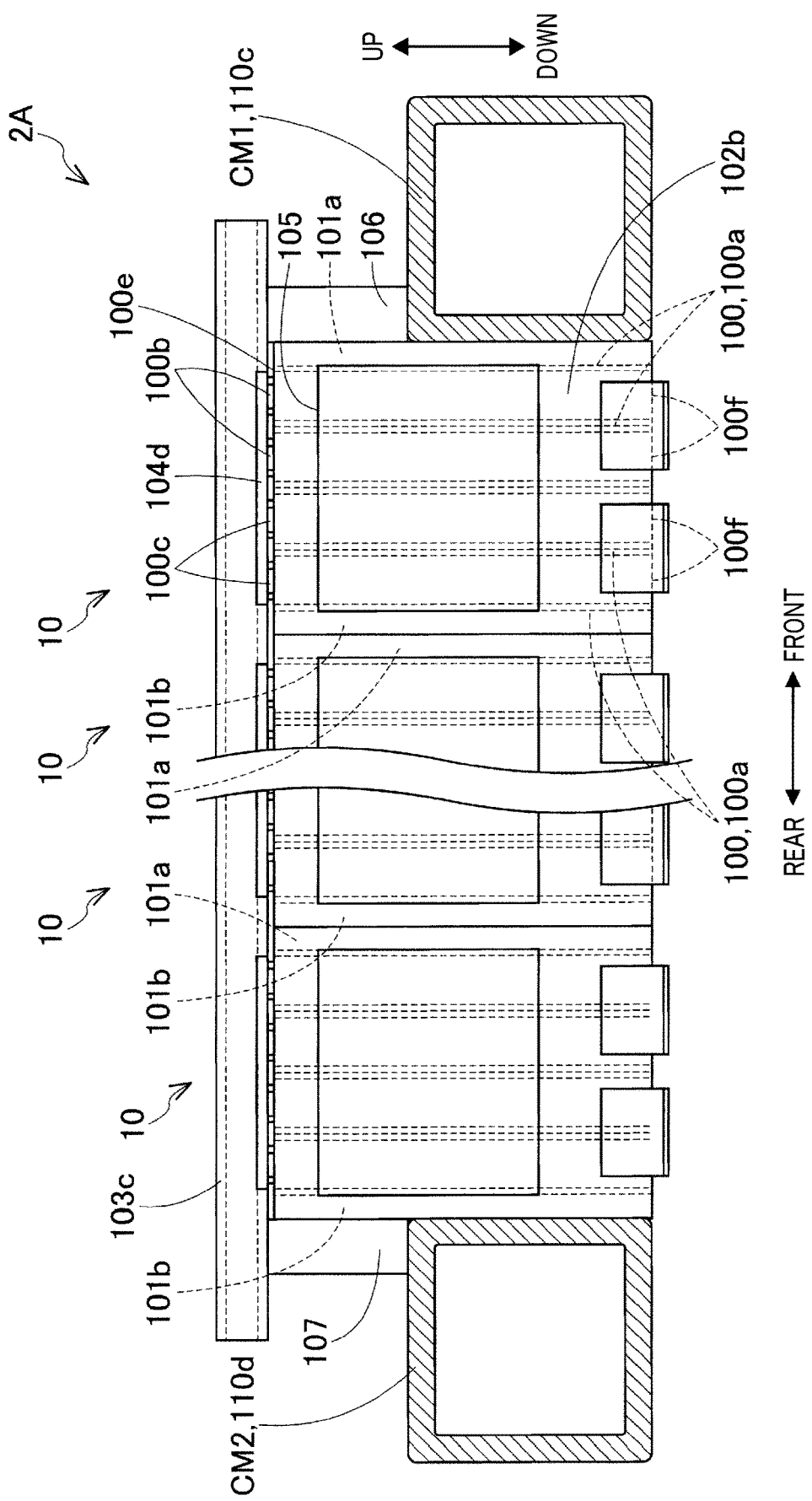
FIG. 18 is a side view of the battery pack according to the modification of the second embodiment.

FIGS. 17 and 18 together show the overall configuration of a battery pack 2A according to a modification of the second embodiment.

In this modification, the battery pack 2A includes a pair of pack end plates 110*c* and 110*d* and a pair of fixing members 106 and 107.

The pack end plate 110*c* is constituted of the cross member CM1 of the vehicle frame FR. As shown in FIG. 18, the pack end plate 110*c* (i.e., the cross member CM1) is arranged to abut the module end plate 101*a* of that battery module 10 which is located most forward in all the battery modules 10. Specifically, the pack end plate 110*c* is arranged to abut a lower part of a front surface of the module end plate 101*a*. More specifically, the pack end plate 110*c* abuts 50% or more of the front surface of the module end plate 101*a*.

In addition, the pack end plate 110c has a strength in the front-rear direction higher than or equal to the strength of the pack end plate 110a described in the first embodiment.

The pack end plate 110d is constituted of the cross member CM2 of the vehicle frame FR. As shown in FIG. 18, the pack end plate 110d (i.e., the cross member CM2) is arranged to abut the module end plate 101b of that battery module 10 which is located most backward in all the battery modules 10. Specifically, the pack end plate 110d is arranged to abut a lower part of a rear surface of the module end plate 101b. More specifically, the pack end plate 110d abuts 50% or more of the rear surface of the module end plate 101b. In addition, the pack end plate 110d has a strength in the front-rear direction higher than or equal to the strength of the pack end plate 110b described in the first embodiment.

The fixing member 106 is provided to fix the restraining members 103a-103c to the pack end plate 110c (i.e., the cross member CM1). On the other hand, the fixing member 107 is provided to fix the restraining members 103a-103c to the pack end plate 110d (i.e., the cross member CM2).

That is, the restraining members 103a-103c are each fixed to the pack end plate 110c via the fixing member 106 and to the pack end plate 110d via the fixing member 107. Consequently, the restraining members 103a-103c restrain the pack end plates 110c and 110d and thus restrain all the module end plates 101a and 101b of the battery modules 10 via the pack end plates 110c and 110d.

In this modification, the pack end plates 110c and 110d are constituted respectively of the cross members CM1 and CM2 already existing in the vehicle. That is, no additional members are employed for constituting the pack end plates 110c and 110d. Consequently, it becomes possible to further reduce the parts count and thus the manufacturing cost of the battery pack 2A. Moreover, it also becomes possible to further reduce the space required to mount the battery pack 2A in the vehicle.

Third Embodiment

Battery packs 3A and 3B according to a third embodiment have a similar configuration to the battery pack 1 according to the first embodiment. Accordingly, only the differences of the battery packs 3A and 3B from the battery pack 1 will be described hereinafter with reference to FIGS. 19 and 20.

In the present embodiment, there are two battery packs 3A and two battery packs 3B mounted in a motor vehicle to supply DC power to, for example, electronic devices (not shown) provided in the vehicle.

Figure 19:
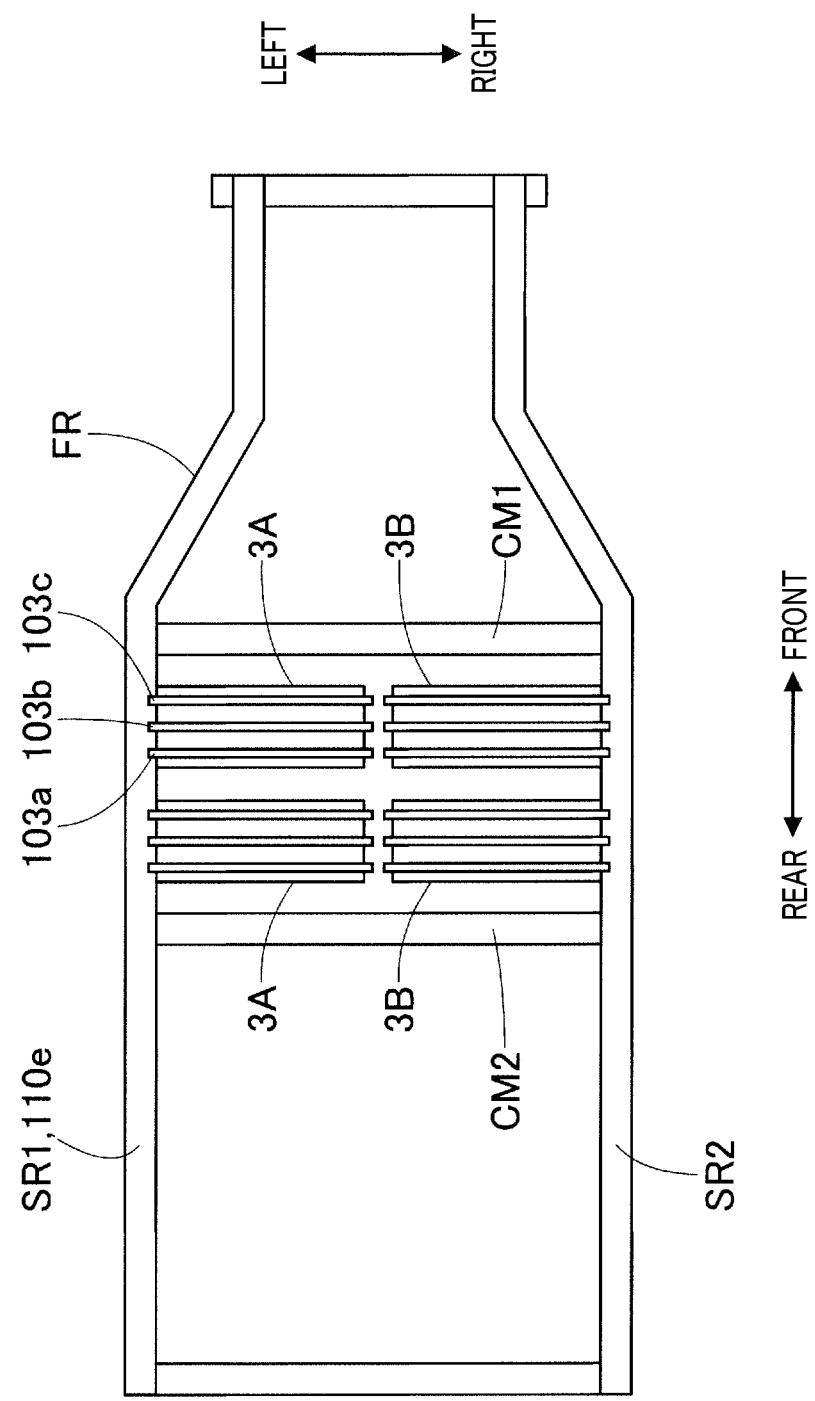
FIG. 19 is a top view of a vehicle frame and battery packs according to a third embodiment, the battery packs being mounted in a motor vehicle.
Figure 20:
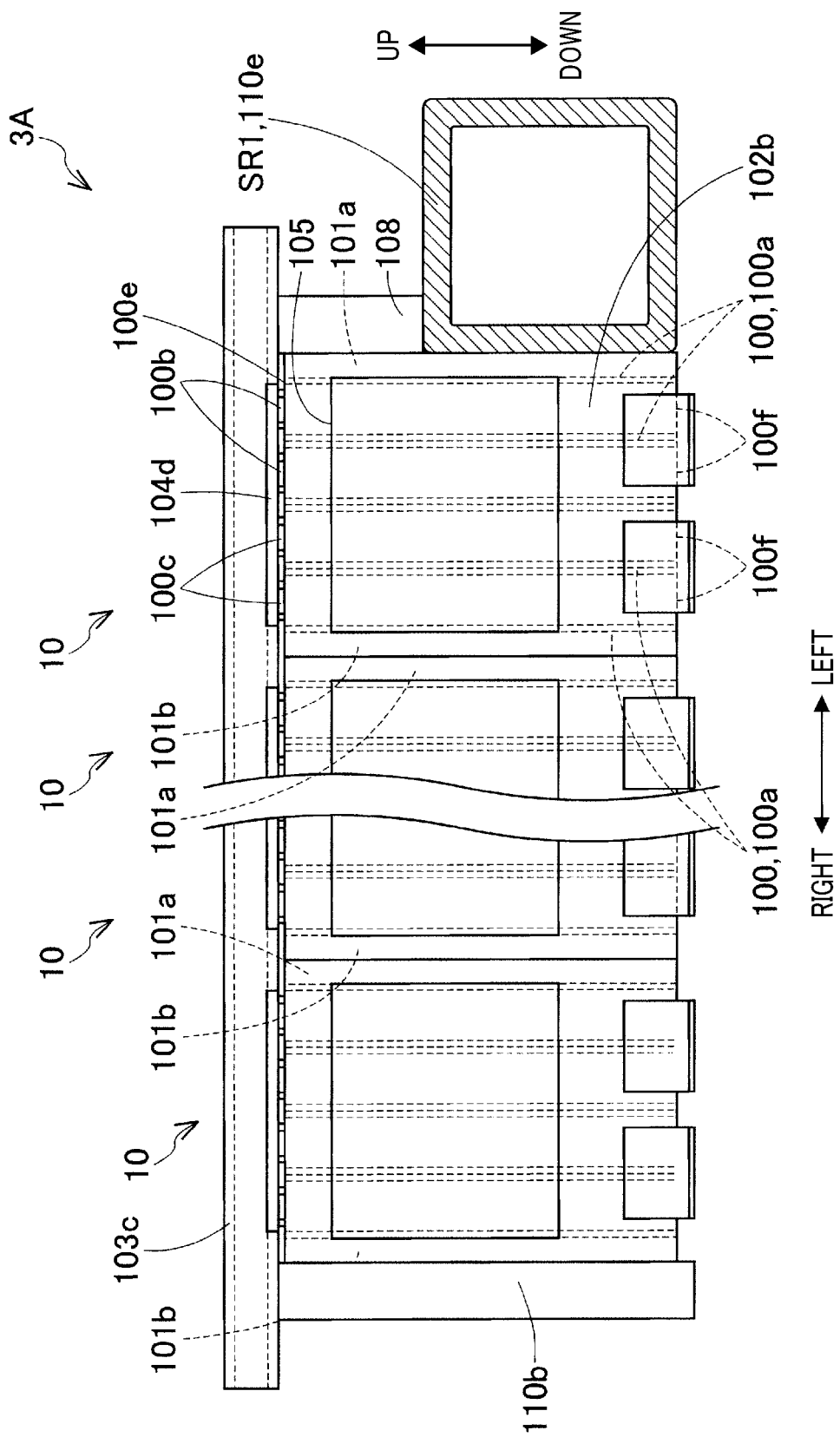
FIG. 20 is a side view of one of the battery packs according to the third embodiment.

It should be noted that FRONT, REAR, LEFT, RIGHT, UP and DOWN in FIGS. 19 and 20 respectively indicate the front, rear, left, right, upper and lower sides from the point of view of a driver of the vehicle facing forward.

As shown in FIG. 19, the battery packs 3A and 3B are mounted to a vehicle frame FR which is identical to the vehicle frame FR described in the second embodiment. That is, the vehicle frame FR includes a pair of side rails SR1 and SR2 and a pair of cross members CM1 and CM2.

As shown in FIGS. 19 and 20, each of the battery packs 3A and 3B is a battery module assembly which is obtained by connecting a plurality of battery modules 10.

Specifically, each of the battery packs 3A includes a plurality of battery modules 10, a pair of pack end plates 110b and 110e, a plurality of restraining members 103a-103c and a fixing member 108.

The battery modules 10 are arranged in alignment with each other in the left-right direction (i.e., a predetermined direction).

The pack end plate 110b is identical to the pack end plate 110b described in the first embodiment.

The pack end plate 110e performs the same function as the pack end plate 110a described in the first embodiment. In the present embodiment, the pack end plate 110e is constituted of the side rail SR1 of the vehicle frame FR. As shown in FIG. 20, the pack end plate 110e (i.e., the side rail SR1) is arranged to abut the module end plate 101a of that battery module 10 which is located most leftward in all the battery modules 10 of the battery pack 3A. Specifically, the pack end plate 110e is arranged to abut a lower part of a left surface of the module end plate 101a. More specifically, the pack end plate 110e abuts 50% or more of the left surface of the module end plate 101a. In addition, the pack end plate 110e has a strength in the left-right direction higher than or equal to the strength of the pack end plate 110a described in the first embodiment.

The fixing member 108 is provided to fix the restraining members 103a-103c to the pack end plate 110e (i.e., the side rail SR1).

The restraining members 103a-103c are each fixed to the pack end plate 110e via the fixing member 108 and fixed directly to the pack end plate 110b. Consequently, the restraining members 103a-103c restrain the pack end plates 110b and 110e and thus restrain all the module end plates 101a and 101b of the battery modules 10 via the pack end plates 110b and 110e.

On the other hand, the battery packs 3B have the same configuration as the battery packs 3A. That is, each of the battery packs 3B also includes a plurality of battery modules 10, a pair of pack end plates 110b and 110e, a plurality of restraining members 103a-103c and a fixing member 108.

However, unlike the battery packs 3A, each of the battery packs 3B has its pack end plate 110e constituted of the side rail SR2 of the vehicle frame FR. Though not shown in the figures, in each of the battery packs 3B, the pack end plate 110e (i.e., the side rail SR2) is arranged to abut the module end plate 101a of that battery module 10 which is located most rightward in all the battery modules 10 of the battery pack 3B. Specifically, the pack end plate 110e is arranged to abut a lower part of a right surface of the module end plate 101a. More specifically, the pack end plate 110e abuts 50% or more of the right surface of the module end plate 101a.

The battery packs 3A and 3B according to the present embodiment have the same advantages as the battery pack 1 according to the first embodiment.

Moreover, in the present embodiment, in each of the battery packs 3A and 3B, the pack end plate 110e is constituted of the side rail SR1 or SR2 already existing in the vehicle. That is, no additional member is employed for constituting the pack end plate 110e. Consequently, it becomes possible to reduce the parts count and thus the manufacturing cost of the battery packs 3A and 3B. Moreover, it also becomes possible to reduce the space required to mount each of the battery packs 3A and 3B in the vehicle.

Modification of Third Embodiment

Figure 21:
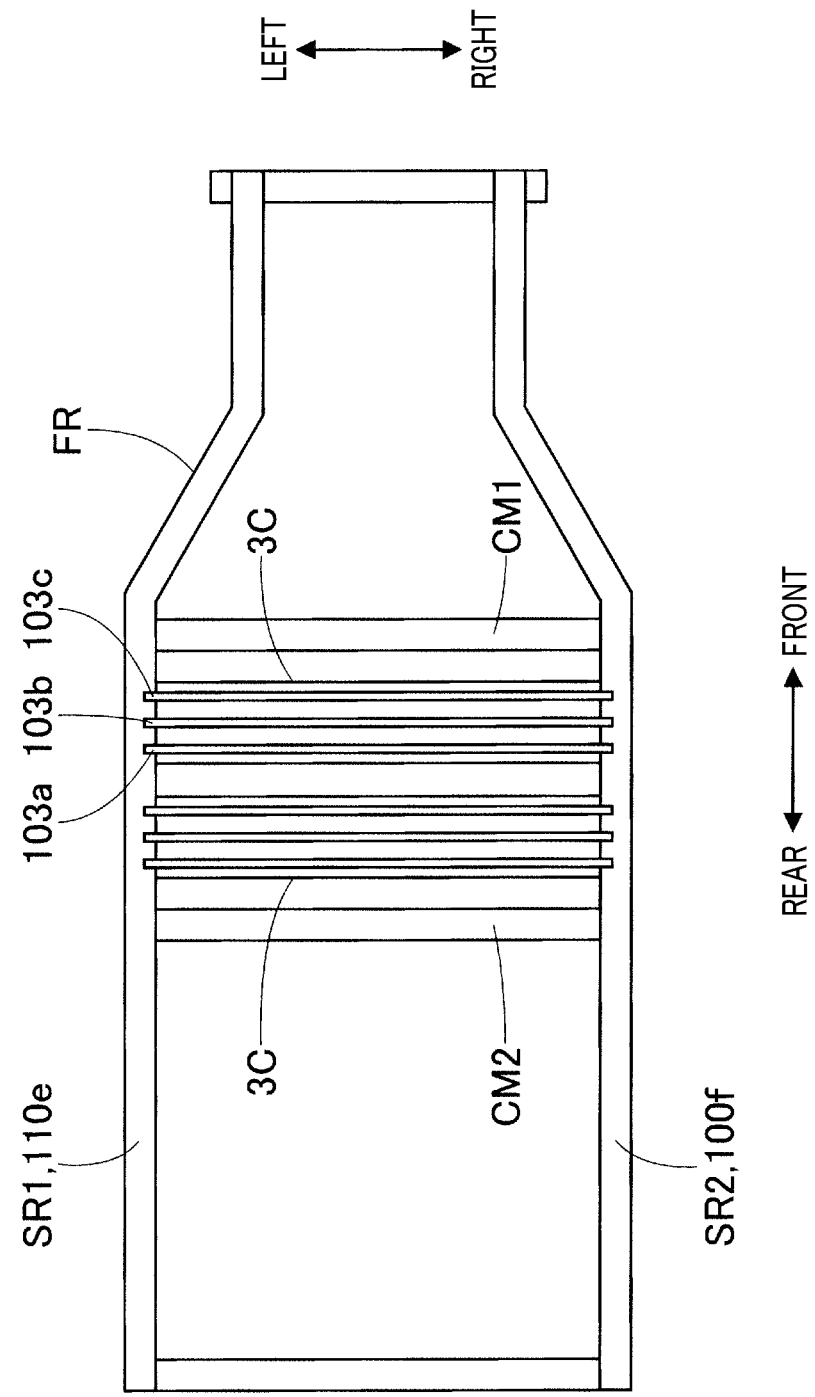
FIG. 21 is a top view of a vehicle frame and battery packs according to a modification of the third embodiment, the battery packs being mounted in a motor vehicle.
Figure 22:
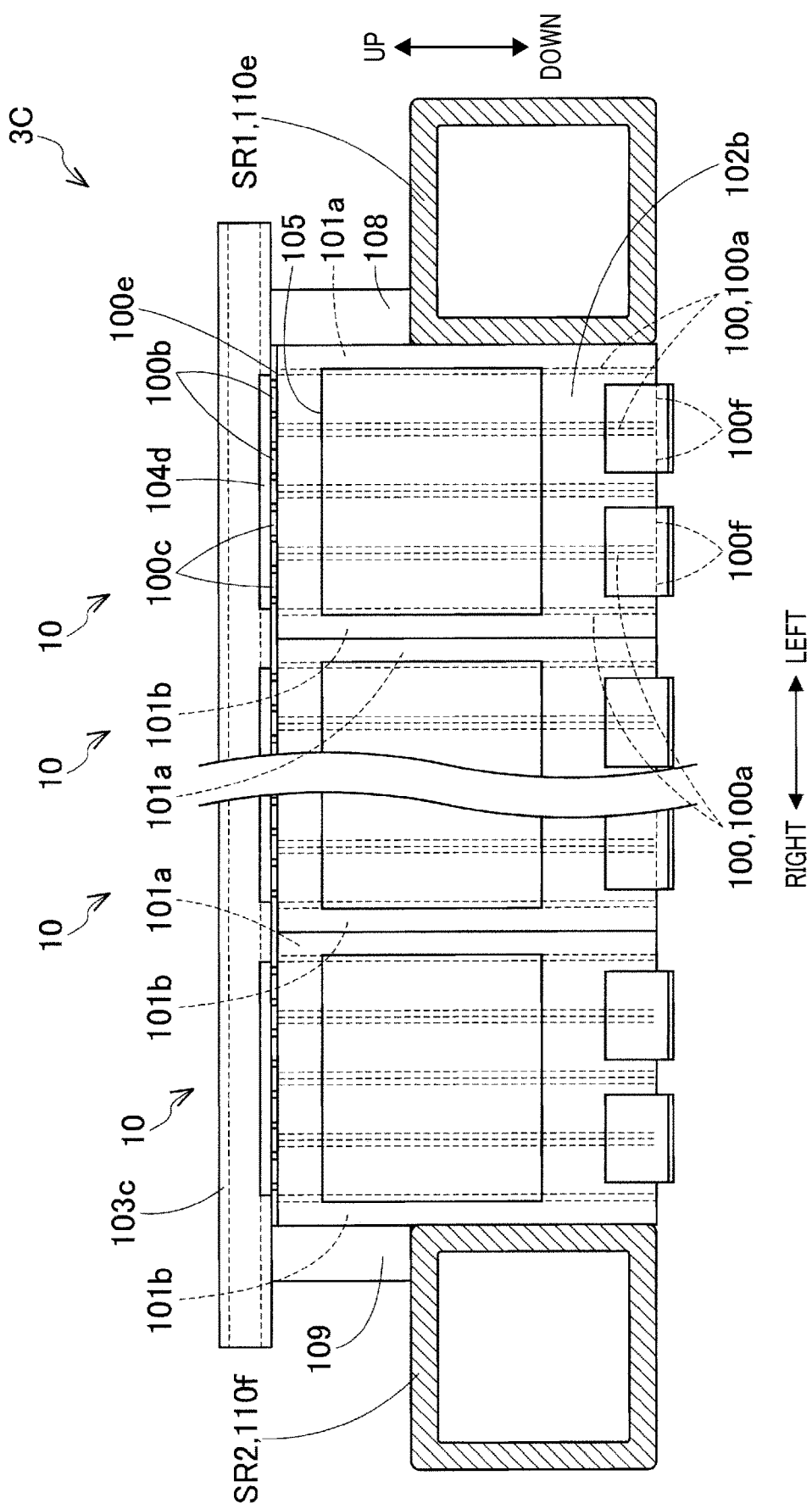
FIG. 22 is a side view of one of the battery packs according to the modification of the third embodiment.

FIGS. 21 and 22 together show the overall configuration of battery packs 3C according to a modification of the third embodiment.

In this modification, each of the battery packs 3C includes a pair of pack end plates 110e and 110f and a pair of fixing members 108 and 109.

The pack end plate 110e is constituted of the side rail SR1 of the vehicle frame FR. As shown in FIG. 22, the pack end plate 110e (i.e., the side rail SR1) is arranged to abut the module end plate 101a of that battery module 10 which is located most leftward in all the battery modules 10 of the battery pack 3C. Specifically, the pack end plate 110e is arranged to abut a lower part of a left surface of the module end plate 101a. More specifically, the pack end plate 110e abuts 50% or more of the left surface of the module end plate 101a. In addition, the pack end plate 110e has a strength in the left-right direction higher than or equal to the strength of the pack end plate 110a described in the first embodiment.

The pack end plate 110f is constituted of the side rail SR2 of the vehicle frame FR. As shown in FIG. 22, the pack end plate 110f (i.e., the side rail SR2) is arranged to abut the module end plate 101b of that battery module 10 which is located most rightward in all the battery modules 10 of the battery pack 3C. Specifically, the pack end plate 110f is arranged to abut a lower part of a right surface of the module end plate 101b. More specifically, the pack end plate 110f abuts 50% or more of the right surface of the module end plate 101b. In addition, the pack end plate 110f has a strength in the left-right direction higher than or equal to the strength of the pack end plate 110b described in the first embodiment.

The fixing member 108 is provided to fix the restraining members 103a-103c to the pack end plate 110e (i.e., the side rail SR1). On the other hand, the fixing member 109 is provided to fix the restraining members 103a-103c to the pack end plate 110f (i.e., the side rail SR2).

That is, the restraining members 103a-103c are each fixed to the pack end plate 110e via the fixing member 108 and to the pack end plate 110f via the fixing member 109. Consequently, the restraining members 103a-103c restrain the pack end plates 110e and 110f and thus restrain all the module end plates 101a and 101b of the battery modules 10 via the pack end plates 110e and 110f.

In this modification, the pack end plates 110e and 110f are constituted respectively of the side rails SR1 and SR2 already existing in the vehicle. That is, no additional members are employed for constituting the pack end plates 110e and 110f. Consequently, it becomes possible to further reduce the parts count and thus the manufacturing cost of the battery packs 3C. Moreover, it also becomes possible to further reduce the space required to mount each of the battery packs 3C in the vehicle.

While the above particular embodiments and modifications have been shown and described, it will be understood by those skilled in the art that various further modifications, changes and improvements may be made without departing from the spirit of the present invention.

What is claimed is:

1. A battery pack comprising:
   at least one battery module comprising a single battery module or a plurality of battery modules arranged in alignment with each other in a predetermined direction, each battery module including a plurality of battery cells and a pair of module end plates, the battery cells being arranged in alignment with each other in the predetermined direction, the module end plates being arranged to hold the battery cells therebetween in the predetermined direction and thereby keep a dimension of the battery module in the predetermined direction constant, each of the module end plates abutting a corresponding one of the battery cells which is located outermost in the battery cells in the predetermined direction; and
   a pair of pack end plates arranged to hold the at least one battery module therebetween in the predetermined direction and thereby keep a dimension of the battery pack in the predetermined direction constant, each of the pack end plates abutting a corresponding one of the module end plates of the at least one battery module which is located outermost in the at least one battery module in the predetermined direction,
   wherein
   a strength of the pack end plates in the predetermined direction is set to be higher than or equal to a minimum required strength to hold the at least one battery module therebetween in a predetermined state where the battery cells of the at least one battery module have deteriorated, and
   a strength of the module end plates of the at least one battery module in the predetermined direction is set to be lower than the strength of the pack end plates in the predetermined direction.

2. The battery pack as set forth in claim 1, wherein the minimum required strength is a strength with which: the pack end plates are kept from being plastically deformed when a minimum load, which is required to hold the at least one battery module between the pack end plates in an initial state where the battery cells of the at least one battery module have not deteriorated, is applied to the pack end plates in the predetermined direction; and the pack end plates are kept from being plastically deformed also in the predetermined state where the battery cells of the at least one battery module have deteriorated.

3. The battery pack as set forth in claim 2, wherein the minimum required strength is twice a minimum strength required to keep the pack end plates from being plastically deformed when the minimum load, which is required to hold the at least one battery module between the pack end plates in the initial state, is applied to the pack end plates in the predetermined direction.

4. The battery pack as set forth in claim 1, wherein the strength of the module end plates of the at least one battery module in the predetermined direction is set to be higher than or equal to a minimum strength required to keep the module end plates from being plastically deformed when a minimum load, which is required to hold the battery cells between the module end plates in an initial state where the battery cells have not deteriorated, is applied to the module end plates in the predetermined direction.

5. The battery pack as set forth in claim 1, wherein the module end plates are formed of the same material as the pack end plates and have a smaller thickness in the predetermined direction than the pack end plates.

6. The battery pack as set forth in claim 1, wherein the module end plates have the same thickness in the predetermined direction as the pack end plates and are formed of a different material from the pack end plates.

7. The battery pack as set forth in claim 1, wherein the predetermined state is a state where capacities of the battery cells have been reduced by 20% from initial values thereof.

8. The battery pack as set forth in claim 1, further comprising at least one restraining member that is fixed to the pack end plates to restrain the pack end plates and thus restrain the module end plates of the at least one battery module via the pack end plates.

9. The battery pack as set forth in claim 1, wherein the battery pack is mounted in a vehicle, and
   at least one of the pack end plates is constituted of a cross member of a vehicle frame.

10. The battery pack as set forth in claim 1, wherein the battery pack is mounted in a vehicle, and
    at least one of the pack end plates is constituted of a side rail of a vehicle frame.

11. The battery pack as set forth in claim 1, wherein
the at least one battery module comprises a plurality of battery modules arranged in alignment with each other in the predetermined direction, each of the battery modules including a plurality of the battery cells and a pair of the module end plates,
the pack end plates are arranged to hold the plurality of battery modules therebetween in the predetermined direction and thereby keep the dimension of the battery pack in the predetermined direction constant, each of the pack end plates abutting a corresponding one of the module end plates of the plurality of battery modules which is located outermost in the plurality of battery modules in the predetermined direction,
the strength of the pack end plates in the predetermined direction is set to be higher than or equal to the minimum required strength to hold the plurality of battery modules therebetween in the predetermined state where the battery cells of the plurality of battery modules have deteriorated, and
the strength of the module end plates of the plurality of battery modules in the predetermined direction is set to be lower than the strength of the pack end plates in the predetermined direction.

* * * * *